(12) United States Patent
King et al.

(10) Patent No.: US 12,185,658 B2
(45) Date of Patent: Jan. 7, 2025

(54) RIDE-ON SPREADER/SPRAYER

(71) Applicant: BRIGGS & STRATTON, LLC, Wauwatosa, WI (US)

(72) Inventors: Brandon King, Wauwatosa, WI (US); Steve Longmeyer, Pleasant Hill, MO (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 466 days.

(21) Appl. No.: 17/065,264

(22) Filed: Oct. 7, 2020

(65) Prior Publication Data

US 2021/0105933 A1 Apr. 15, 2021

Related U.S. Application Data

(60) Provisional application No. 63/019,826, filed on May 4, 2020, provisional application No. 62/914,006, filed on Oct. 11, 2019.

(51) Int. Cl.
| | |
|---|---|
| *B05B 13/00* | (2006.01) |
| *A01C 7/06* | (2006.01) |
| *A01C 7/08* | (2006.01) |
| *A01C 15/00* | (2006.01) |
| *A01C 23/00* | (2006.01) |
| *A01C 23/04* | (2006.01) |

(52) U.S. Cl.
CPC .............. *A01C 7/06* (2013.01); *A01C 7/085* (2013.01); *A01C 15/006* (2013.01); *A01C 23/008* (2013.01); *A01C 23/047* (2013.01); *B05B 13/005* (2013.01)

(58) Field of Classification Search
CPC ......... B05B 13/005; A01C 7/06; A01C 7/085; A01C 15/006; A01C 23/008; A01C 23/047
USPC ........................................................ 239/662
See application file for complete search history.

(56) References Cited

U.S. PATENT DOCUMENTS

| | | | | |
|---|---|---|---|---|
| 3,586,246 A | * | 6/1971 | Van Der Lely | ....... E01C 19/203 239/665 |
| 3,898,891 A | * | 8/1975 | Colloton | ................ B60K 23/00 74/473.11 |
| 3,913,837 A | * | 10/1975 | Grant | ........................ B05B 3/18 239/198 |

(Continued)

OTHER PUBLICATIONS

Mowwithferris, "Ferris Stand-On Spreader/Sprayers", Video, uploaded to YouTube on Nov. 6, 2018, https://www.youtube.com/watch?v=bp_tldKDVE0&feature=emb_logo, 2 pages of screenshots.

*Primary Examiner* — Chee-Chong Lee
(74) *Attorney, Agent, or Firm* — Foley & Lardner LLP

(57) ABSTRACT

A ride-on spreader/sprayer including a hopper configured to receive expel dry material, a user platform configured to receive and support a user of the ride-on spreader/sprayer, a fluid storage tank providing a fluid storage volume and including an inlet for adding fluid to the fluid storage volume, an exit by which the fluid exits the fluid storage volume, a first fluid passage, and a drain channel defining a second fluid passage separate from the first fluid passage, wherein the fluid may reach the exit through at least one of the first fluid passage and the second fluid passage, a pump fluidly coupled to the exit of the fluid storage tank, and multiple spray nozzles fluidly coupled to the pump.

8 Claims, 28 Drawing Sheets

(56) References Cited

U.S. PATENT DOCUMENTS

| | | | | |
|---|---|---|---|---|
| 3,987,964 | A | * | 10/1976 | Pittman ..................... E01H 3/02 |
| | | | | 356/400 |
| 4,083,495 | A | * | 4/1978 | Sharp ...................... E01H 1/101 |
| | | | | 239/754 |
| 7,839,301 | B2 | * | 11/2010 | Doherty ................ E01H 10/007 |
| | | | | 239/662 |
| 8,056,828 | B1 | * | 11/2011 | Kline ................... A01C 17/006 |
| | | | | 239/147 |

* cited by examiner

RIDE-ON SPREADER/SPRAYER

CROSS-REFERENCE TO RELATED PATENT APPLICATIONS

This application claims the benefit of U.S. Provisional Application No. 62/914,006, filed Oct. 11, 2019, and U.S. Provisional Application No. 63/019,826, filed May 4, 2020, which are both incorporated herein by reference in their entireties.

BACKGROUND

The present disclosure relates generally to the field of chemical spreaders/sprayers. More specifically, the disclosure relates to ride-on chemical spreaders/sprayers and the systems used within the ride-on chemical spreaders/sprayers Ride-on chemical spreaders/sprayers come in all sorts of sizes and configurations including rider spreaders/sprayers, stand-on spreaders/sprayers, and turf chemical spreaders/sprayers. Often ride-on spreaders/sprayers have highly variable weight and centers of gravity as the loads, configurations, and chemical volumes change. Because of the high variability in weight and center of gravity, ride-on spreaders/sprayers often struggle getting up hills, going down hills, and evenly applying chemicals in varying terrains.

SUMMARY

One embodiment relates to a ride-on spreader/sprayer including a hopper configured to receive expel dry material, a user platform configured to receive and support a user of the ride-on spreader/sprayer, a fluid storage tank providing a fluid storage volume and including an inlet for adding fluid to the fluid storage volume, an exit by which the fluid exits the fluid storage volume, a first fluid passage, and a drain channel defining a second fluid passage separate from the first fluid passage, wherein the fluid may reach the exit through at least one of the first fluid passage and the second fluid passage, a pump fluidly coupled to the exit of the fluid storage tank, and multiple spray nozzles fluidly coupled to the pump.

One embodiment relates to a ride-on spreader/sprayer including a user platform configured to receive and support a user of the ride-on spreader/sprayer, a hopper extending from a first hopper end to a second hopper end such that the first hopper end is located lower than the second hopper end and is configured to receive and expel dry material, a fluid storage tank providing a fluid storage volume, a pump fluidly coupled to the fluid storage tank, multiple spray nozzles fluidly coupled to the pump, and a boom including a base, a first wing pivotally attached to the base such that the first wing can pivot relative to the base, and a second wing pivotally attached to the base such that the second wing can pivot relative to the base, wherein at least one of the spray nozzles is coupled to each of the first wing and the second wing such that the boom provides for approximately twelve feet of spray width during operation.

Another embodiment relates to a spreader/sprayer including a support frame having one or more first wheels, a front axle, a fluid storage tank, a pump, and multiple spray nozzles fluidly coupled to the pump. The front axle is pivotably coupled to the support frame and has one or more second wheels. The fluid storage tank provides a fluid storage volume and includes an inlet for adding fluid to the fluid storage tank, an exit by which the fluid exits the fluid storage volume, a first fluid passage, and a drain channel defining a second fluid passage separate from the first fluid passage. The fluid may reach the exit through at least one of the first fluid passage and the second fluid passage. The pump is fluidly coupled to the exit of the fluid storage tank.

Another embodiment relates to a ride-on spreader/sprayer including a support frame having one or more first wheels, a front axle, a hopper, a fluid storage tank, a pump, and multiple spray nozzles fluidly coupled to the pump. The front axle is pivotably coupled to the support frame and has one or more second wheels. The hopper extends from a first hopper end to a second hopper end such that the first hopper end is located lower than the second hopper end and is configured to receive and expel dry material. The fluid storage tank provides a fluid storage volume. The pump is fluidly coupled to the fluid storage tank.

Another embodiment relates to a ride-on spreader/sprayer including a user platform configured to receive and support a user of the ride-on spreader/sprayer, a support frame having one or more drive wheels, a front axle, a prime mover, a drive handle, a speed limiting handle, an adjustable hand stop, a fluid storage tank, a pump, and multiple spray nozzles fluidly coupled to the pump. The front axle is pivotably coupled to the support frame and has one or more non-drive wheels. The prime mover is coupled to the support frame and is operatively coupled to at least one of the drive wheels. The drive handle is operatively coupled to the prime mover to selectively control direction of rotation and speed of rotation of at least one of the drive wheels. The speed limiting handle is configured to selectively limit movement of the drive handle. The adjustable hand stop is coupled to the speed limiting handle and is moveable between a locked position and a non-locked position. When the adjustable hand stop is moved to the locked position, the speed limiting handle is locked into place and the drive handle is limited in movement. The fluid storage tank provides a fluid storage volume. The pump is fluidly coupled to the fluid storage tank.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, described herein is a ride-on spreader/sprayer. The ride-on spreader/sprayer can include a support frame, a front axle, a prime mover, a sprayer system, a spreader system, a user support, and a user interface. The sprayer system may include a pump, a plurality of spray nozzles, a pressure regulator, at least one chemical storage tank, a sprayer valve system, and a plurality of hoses. The sprayer system receiving and spraying a specified chemical or fluid. The spreader system may include a hopper, an electric motor, and a spinner. The spreader system receiving and spreading a specified grain, seed, fertilizer, or pellet. The user interface may include a display screen, a ride-on spreader/sprayer speed handle, a two steering handles, and a variety of other controls for controlling the ride-on spreader/sprayer and its systems. In operation, a user rides the ride-on spreader/sprayer by standing or sitting on the user support. The user may control the spreader/sprayer by providing user input to the user interface. The spreader system receives and spreads a specified fertilizer, grain, seed, or pellet. The sprayer system receives and sprays a specified chemical or fluid. The prime mover may drive the ride-on spreader/sprayer.

Figure 1:
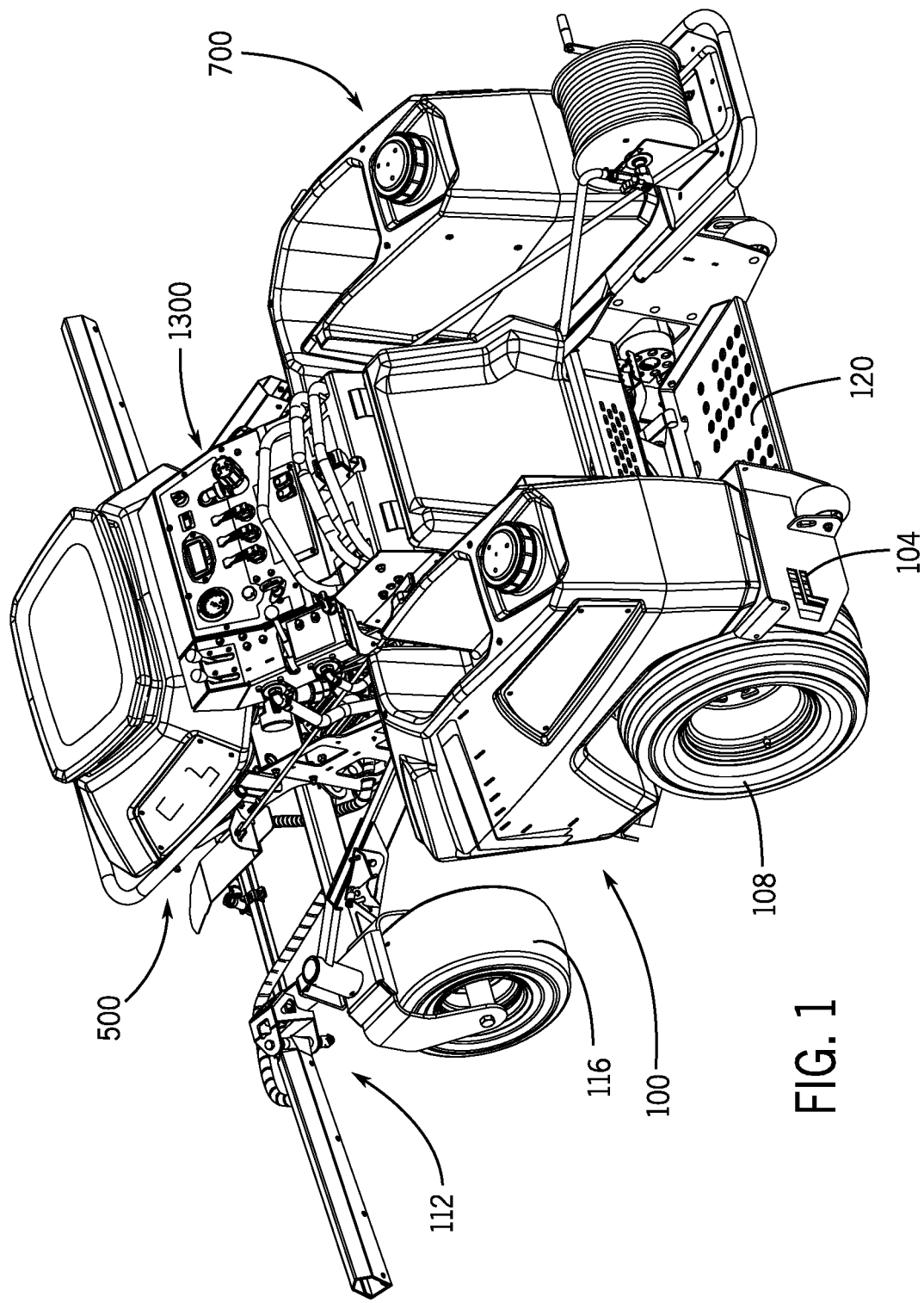
FIG. 1 is a rear perspective view of a ride-on spreader/sprayer, according to an exemplary embodiment.
Figure 2:
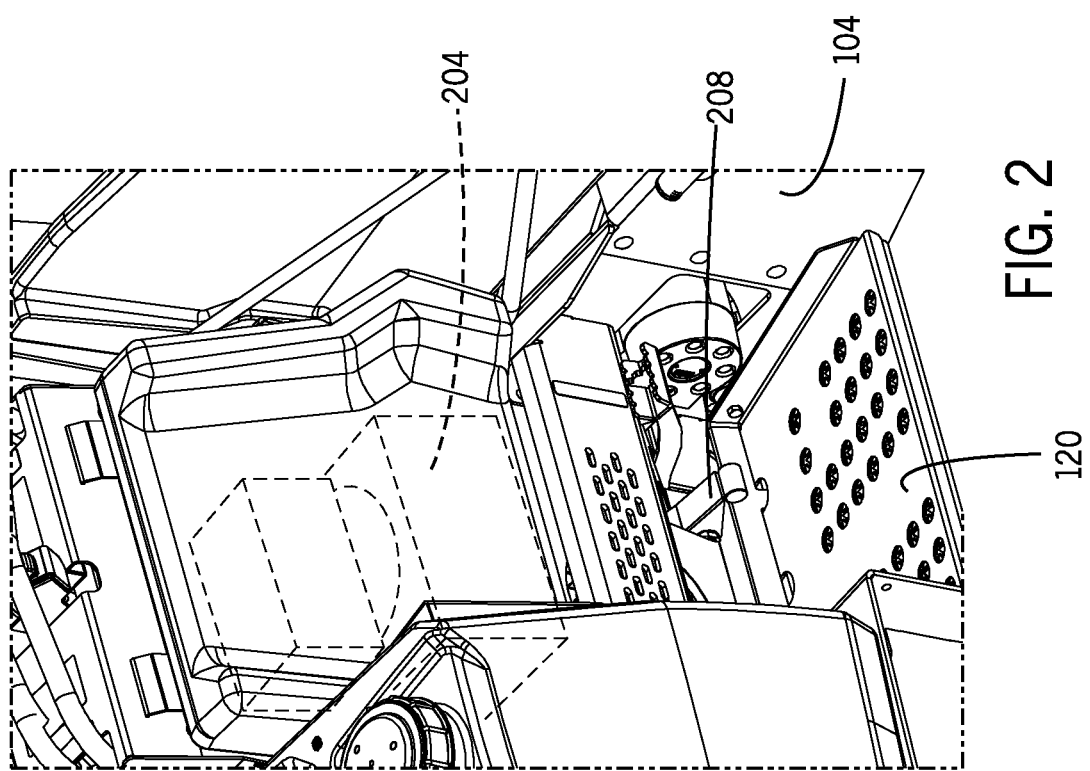
FIG. 2 is a rear view of the ride-on spreader/sprayer of FIG. 1 and a prime mover within.

Referring now to FIGS. 1-2, according to an exemplary embodiment, a ride-on spreader/sprayer 100 is shown. The ride-on spreader/sprayer 100 includes a support frame 104 having multiple first wheels (e.g., drive wheels) 108, a front axle 112 having multiple second wheels 116, a user support or user platform 120, a prime mover 204, a spreader system 500, a sprayer system 700, and a user interface 1300. The user interface 1300 allows the user to control the many different system of the spreader/sprayer 100 as will be described further herein. The spreader system 500 receives and spreads a specified grain, seed, fertilizer, or pellet as will be described further herein. The sprayer system 700 receives and sprays a specified chemical or fluid as will be described further herein. The support frame 104 may support the components of the spreader/sprayer 100 such as the user support 120 or the prime mover 204 (e.g. an internal combustion engine or an electric motor). As the ride-on spreader/sprayer 100 is a drivable device (i.e. a device that is driven by a prime mover and includes wheels to go from one place to another), it needs structure to support all of its internal and external components and to couple all of the components to the first plurality of wheels 108. The support frame 104 provides that structure. The support frame 104 includes the first wheels 108 that separates the support frame 104 from ground.

The user support 120 may be a flat platform configured to receive and support the user of the ride-on spreader/sprayer 100. The user support 120 may be a flat area for a user to stand while riding the ride-on spreader/sprayer 100. In some embodiments, the user support 120 is a seat configured for a user to sit upon while riding the ride-on spreader/sprayer 100. In further embodiments, the user support 120 is coupled to a cabin that protects the user while they ride the spreader/sprayer 100. The user support 120 may include a foot brake (e.g., a brake pedal) 208. The foot brake 208 allowing the user to slow down the ride-on spreader/sprayer 100 by applying pressure to the foot brake 208. When pressed down (compressed), the foot brake 208 may compress a brake caliper coupled to the first wheels 108. The brake caliper may provide a resistance to the first wheels 108 and slow the ride-on spreader/sprayer 100. In some embodiments, the brake caliper is coupled to the second plurality of wheels 116 and provides resistance to the second wheels 116 when the foot brake 208 is pressed down. The front axle 112 provides support to the ride-on spreader/sprayer 100 and will be described further herein. The prime mover 204 may be any sort of prime mover such as an electric motor, an internal combustion engine, a steam engine, hydraulic actuation, etc. As such, the prime mover 204 may further include any required components. For example, the prime mover 204 may be an internal combustion engine including a gas tank for providing fuel for the internal combustion engine, or the prime mover 204 may be an electric motor a power supply (e.g., one or more rechargeable batteries) for powering the electric motor.

Figure 3:
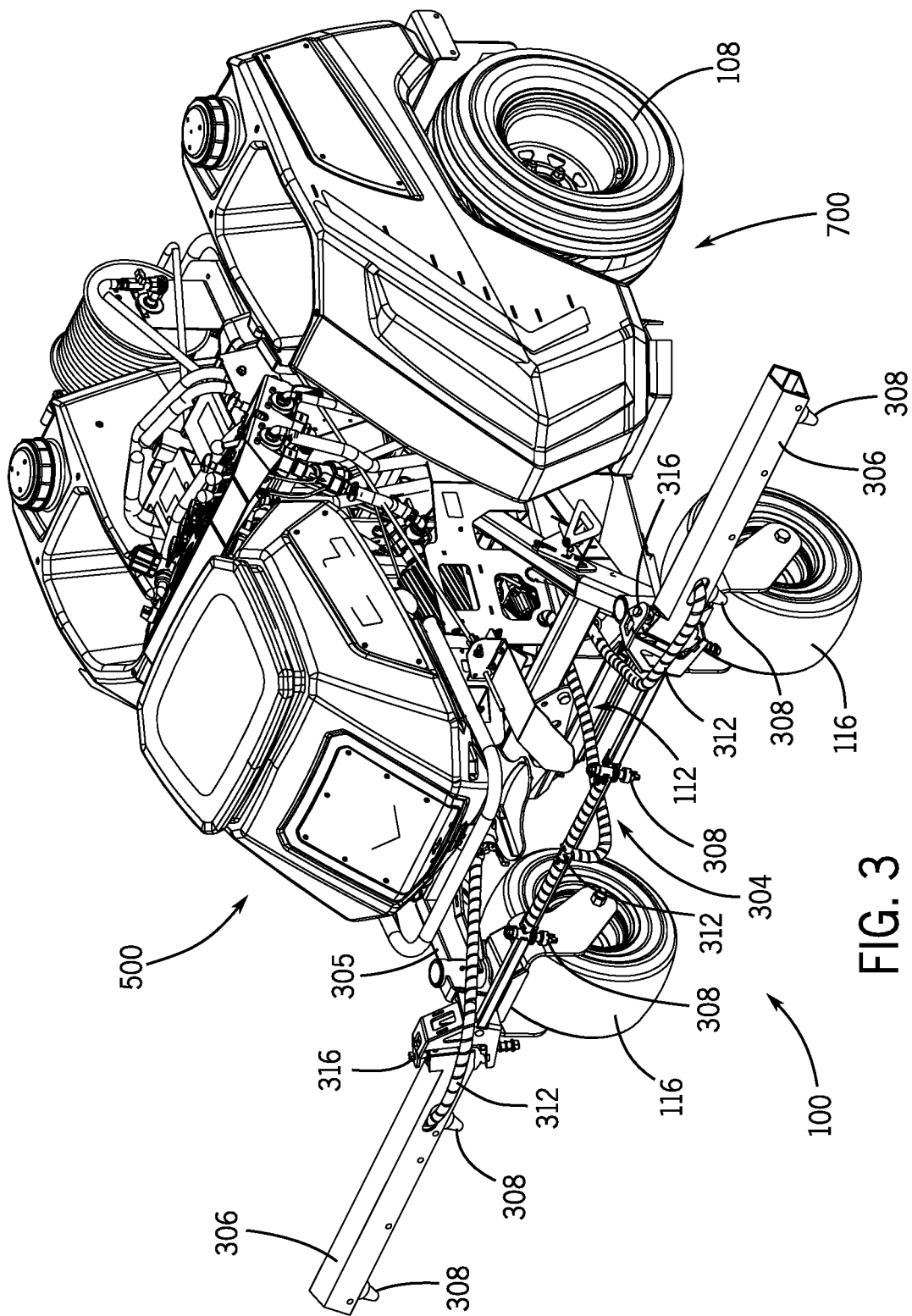
FIG. 3 is a front perspective view of the ride-on spreader/sprayer of FIG. 1.
Figure 4:
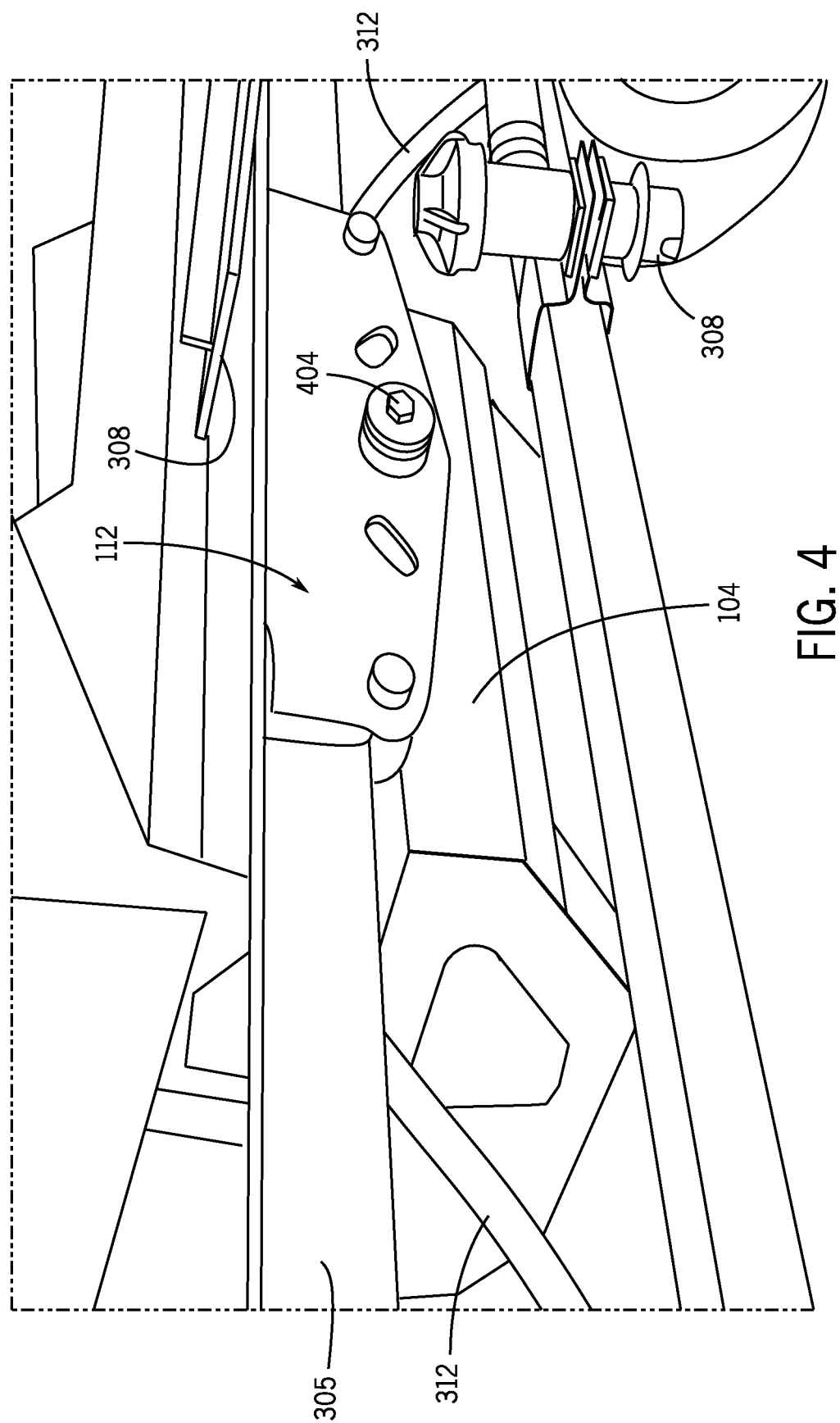
FIG. 4 is a front perspective view of a front axle of the ride-on spreader/sprayer of FIG. 1.

Referring now to FIGS. 3-4, the front axle 112 is pivotably coupled to the support frame 104 through the use of fastener 404. The fastener 404 couples the front axle 112 to the support frame 104 while allowing it to rotate about the shaft axis of the fastener 404 with respect to the support frame 104. This allows the front axle 112 to rotate with respect to the support frame 104 and stay parallel to the ground. As the ride-on spreader/sprayer 100 is used to either fertilize, seed, or apply liquids to the ground, it is important that the front axle 112 can stay parallel to the ground. In some embodiments, the fastener 404 is a bolt including a nut on one end. The front axle 112 may further include a plurality of stop pins that prevent the front axle 112 from rotating too far. In some embodiments, the stop pins prevent the front axle from rotating more than 6 degrees clockwise or counter clockwise with respect to the support frame 104. The ride-on front axle 112 may further include a boom 304. The boom 304 extends below and to the side of the ride-on spreader/sprayer 100 and extends the spray width of the spreader/sprayer 100. In some embodiments, the boom 304 provides for a spray width (e.g., total length the boom 304 covers when it sprays) of approximately 12 feet. In other embodiments, the boom 304 provides for a spray width of approximately 8-16 feet. The boom 304 is coupled to the front axle 112 and rotates with the front axle 112. The boom 304 includes a base 305, two wings 306, and multiple spray nozzles 308 for spraying a fluid. The two wings 306 extend to the sides spreader/sprayer 100 and extend the spraying range of the ride-on spreader/sprayer 100 compared to a sprayer that does not include wings. The spray nozzles 308 are fluidly coupled to the sprayer system 700 and receive a fluid from components of the sprayer system 700. In some embodiments, the boom 304 is coupled to multiple hoses 312 to get the fluid to the spray nozzles 308. In some embodiments, the hoses 312 are corrosion resistant hoses. The spray nozzles 308 spray the fluid in a specified pattern. In further embodiments, at least one spray nozzle 308 is coupled to and located on the bottom of the base 305 and each wing 306. In further embodiments, the spray nozzles 308 are located 20 inches relative to one another along the base 305 and each wing 306. In some embodiments the pattern is adjustable. In other embodiments, the pattern is a 110 degree fan pattern. In additional embodiments, the spray nozzles 308 are angled at 15 degrees relative to the ground and form an overlapping pattern.

By including the boom 304, the spreader/sprayer 100 can further extend its spraying range from a small area under the front axle 112 to a large area covered by the base 305 and the wings 306. Additionally as the boom 304 and therefore the spray nozzles 308 are coupled to the front axle 112, the spreader/sprayer 100 better provides an even coating of the fluid to the ground. Spreaders/sprayers that do not include a pivotably coupled front axle provide an uneven coating when on uneven ground. This is because as the terrain changes, the spray nozzles do not follow the ground and therefore do not maintain a consistent distance from the ground. As the spray nozzles 308 of the boom 304 pivot with the ground, the spray nozzles 308 maintain a desired (and/or specified) distance from the ground on uneven terrain and therefore consistently spray an even coat of the fluid on the ground. This saves on fluid, provides a more consistent coating, and covers a larger spray distance.

The base 305 is fixedly coupled to the support frame 104. In some embodiments, the boom 304 includes two hinges 316 that pivotally attach the base 305 to the wings 306. The hinges 316 allow rotation (e.g., 90 degrees) of the wings 306 in the forward or rearward directions relative to the base 305. Herein forward refers to the forward direction of movement for the ride-on spreader/sprayer 100 and rearward refers to the direction, exactly the opposite of forward (180 degrees from the forward direction). In further embodiments, the hinges allow rotation (e.g., 90 degrees) in the clockwise or counter clockwise direction, wherein clockwise refers to the forward direction and counter clockwise refers to the rearward direction relative to the base 305. This allows the boom 304 to be adjustable in length from the sides of the ride-on spreader/sprayer 100, allowing for easier storage of the spreader/sprayer 100 as the overall width (length from the end of the first wing 306 to the end of the second wing 306) of the boom 304 and therefore the ride-on spreader/sprayer 100 is reduced. More so, the hinges 316 reduces damage to the machine if either wings 306 receives an impact. As many booms do not contain a hinge, it is a common problem for a collision impacting the wings to seriously damage the wings. When the wings 306 receive an impact, the energy of the impact is transferred to the rotational movement of the wings 306 along the hinges 316 with respect to the base 305, and the wings 306 fold either forward or backward. This may save the wings 306 from extensive damage. In further embodiments, the boom 304 includes a center wing that connects the first wing 306 to the second wing 306 and is coupled to at least one spray nozzle 308.

The front axle 112 further includes the second wheels 116. In some embodiments the first wheels 108 and the second wheels 116 are similar. In further embodiments, a wheel speed sensor is coupled to each wheel 108 and each wheel 116 to sense speed and direction values of each wheel 108 and each wheel 116. In other embodiments, the wheel speed sensor is coupled to or incorporated with the prime mover 204 driving the first wheels 108 or the second wheels 116. In some embodiments, the first wheels 108 are driven by the prime mover 204 and the second wheels 116 are free-wheeling and not driven by a motor. In other embodiments, it is the opposite and the second wheels 116 are driven by the prime mover 204 and the first wheels 108 are free-wheeling and not driven by a motor. The first wheels 108 and the second wheels 116 are wider and have a larger diameter than conventional spreader/sprayer wheels as to spread the weight of the ride-on spreader/sprayer 100 and create less ground pressure. It is important to create less ground pressure as often the ride-on spreader/sprayer 100 may be used for fertilizing grass or turf. If the spreader/sprayer 100 provides a large amount of ground pressure, the grass and or turf that is being fertilized can be damaged. By spreading the ground pressure out using wide tires with a large diameter, the weight on the grass or turf is reduced and the grass or turf is better protected. More so as the width of the tires is greater than the conventional tire size, the first wheels 108 and the second wheels 116 better grip the ground creating better hill climbing abilities.

Figure 5:
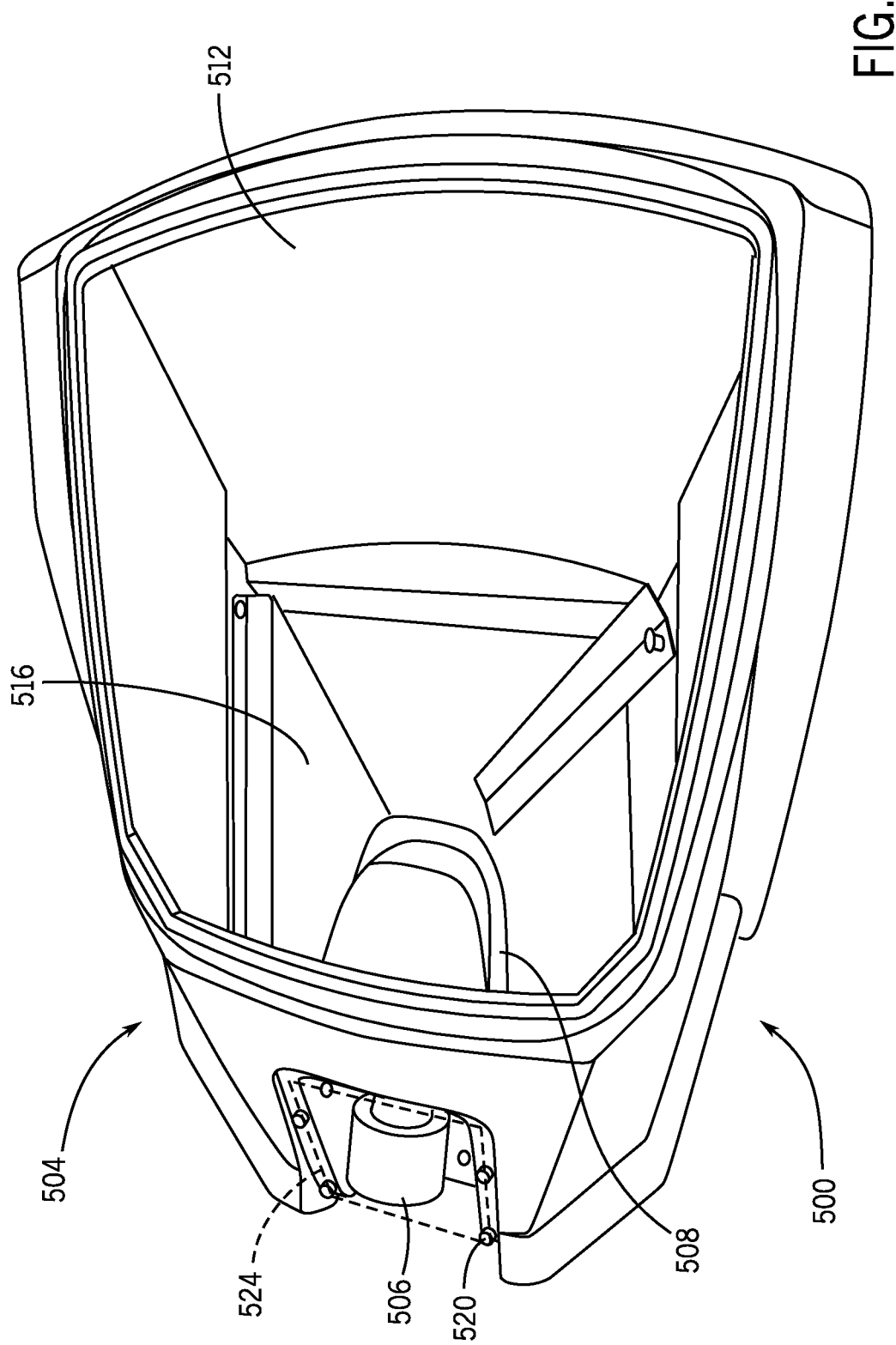
FIG. 5 is a perspective view of a spreader system of the ride-on spreader/sprayer of FIG. 1.
Figure 6:
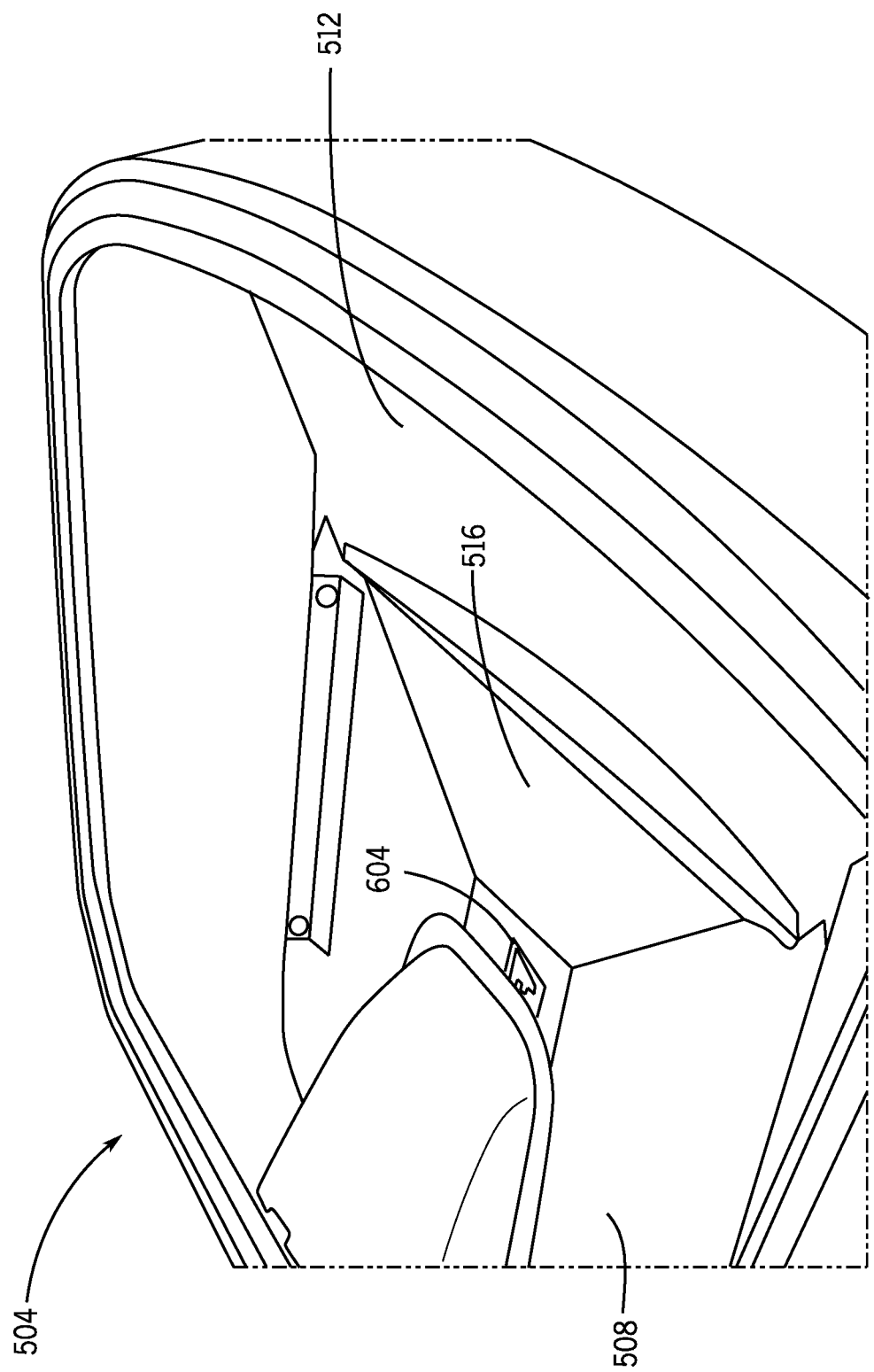
FIG. 6 is side perspective view of a hopper of the ride-on spreader/sprayer of FIG. 1.

Turning now to FIGS. 4-6, the ride-on spreader/sprayer 100 further includes a spreader system 500. The spreader system 500 may include a hopper 504, a spreader motor 506, and a spinner 408. The hopper 504 is an elongated shape that extends from the first hopper end 508 to a second hopper end 512 defining a cavity 516. The cavity 516 may selectively receive a dry material such as fertilizer pellets, granular chemical, fertilizer grains, seed, or grain that is meant to be spread. The hopper may further include a gate 604 that selectively opens and closes. When the gate 604 is open, the dry material naturally falls out of the cavity 516 through the gate 604 and onto the spinner 408. The spinner 408 is driven by the spreader motor 506 and spreads the dry material in a specified pattern at a specified speed and feed rate. In some embodiments, the gate 604 selectively opens to a certain degree based on the specified feed rate. For example, if the specified feed rate is at a maximum the gate 604 may open fully, or if the specified rate is at half of maximum the gate 604 may open half-way between fully open and fully closed. In further embodiments, the spreader system 500 further includes a shaker mechanism configured to shake the hopper 504 and help dry material fall through the gate 604 and out of the cavity 516. In other embodiments, the spinner 408 may have a shape that spreads the dry material in a specified pattern. In further embodiments, the pattern spreads the dry material based on what is being spread by the spinner 408. For example, fertilizer may be spread out in a much denser pattern than seed. The spinner 408 is driven by the spreader motor 506. The spreader motor 506 is contained within a motor cavity (e.g., a motor compartment) 520 that is separate from cavity 516 as to protect the spreader motor 506 from the dry material. In many hoppers, a motor is contained within a same cavity as fertilizer, seed, pellets, or grain. Because of this the fertilizer, seed pellets, or grain often come into contact with the motor. As the motor contains a large amount of moving parts, small grain, seed, fertilizer or pellets can get caught in the motor and cause damage or corrosion. Because the spreader motor 506 is in the separate motor cavity 520, the spreader motor 506 is better protected and requires less maintenance. In other embodiments, the motor cavity 520 includes a door 524. The door 524 protects the spreader motor 506 and selectively opens and closes. When closed, the door 524 seals the spreader motor 506 in the motor cavity 520 protecting it from external fluids, debris, and from the dry material in the hopper 504. When open, the spreader motor 506 may be accessed for maintenance and other routine uses.

As shown, the first hopper end 508 may be lower than the second hopper end 512. Implementing a hopper 504 with a first hopper end 508 lower than the second hopper end 512 allows the dry material within the cavity 516 to naturally fall out of the gate 604 (when open). In many spreaders, a hopper is included that has a first hopper end at the same height as a second hopper end having the lowest point in the center of the hopper. In these implementations, the center of gravity is approximately at the center of the hopper along with a gate. By having an elongated shape with a first hopper end 508 lower than a second hopper end 512, the center of gravity of the hopper 504 is not located directly in the center of the hopper 504. Instead because the hopper 504 is an elongated shape, the center of gravity is located toward the second hopper end 512. This is also true when the cavity 516 is loaded with the dry material. The hopper 504 is often located on the front of the spreader/sprayer 100 to spread material to the same area that the sprayer nozzles 308 are spraying fluid to. By moving the center of gravity of the hopper 504 toward the second hopper end 512, the weight of the hopper 504 does not sit as far forward on the support frame 104 and better allows the spreader/sprayer 100 to distribute its weight. This provides a large advantage when going up or down hills and provides the spreader/sprayer 100 with a center of gravity that at least partially does not move significantly when the hopper is full of material or is empty of material. Because the center of gravity does not move as much, the spreader/sprayer 100 can navigate hilly terrain without a large change in performance. In further embodiments, the hopper 504 may be located on the back end of the spreader/sprayer 100, the sides of the spreader/sprayer 100, or in various other locations.

Figure 7:
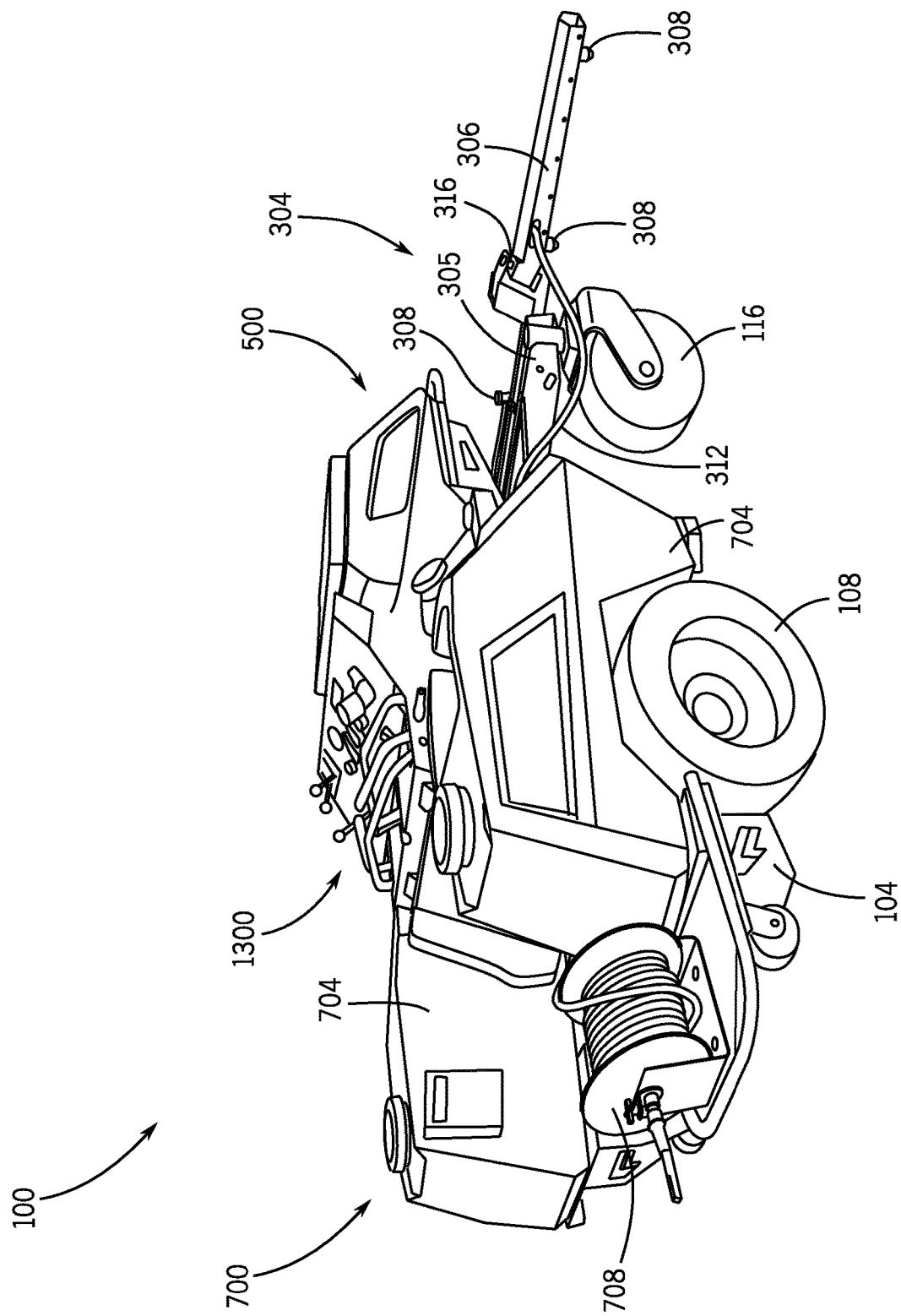
FIG. 7 is a rear perspective view of a sprayer system of the ride-on spreader/sprayer of FIG. 1.
Figure 8:
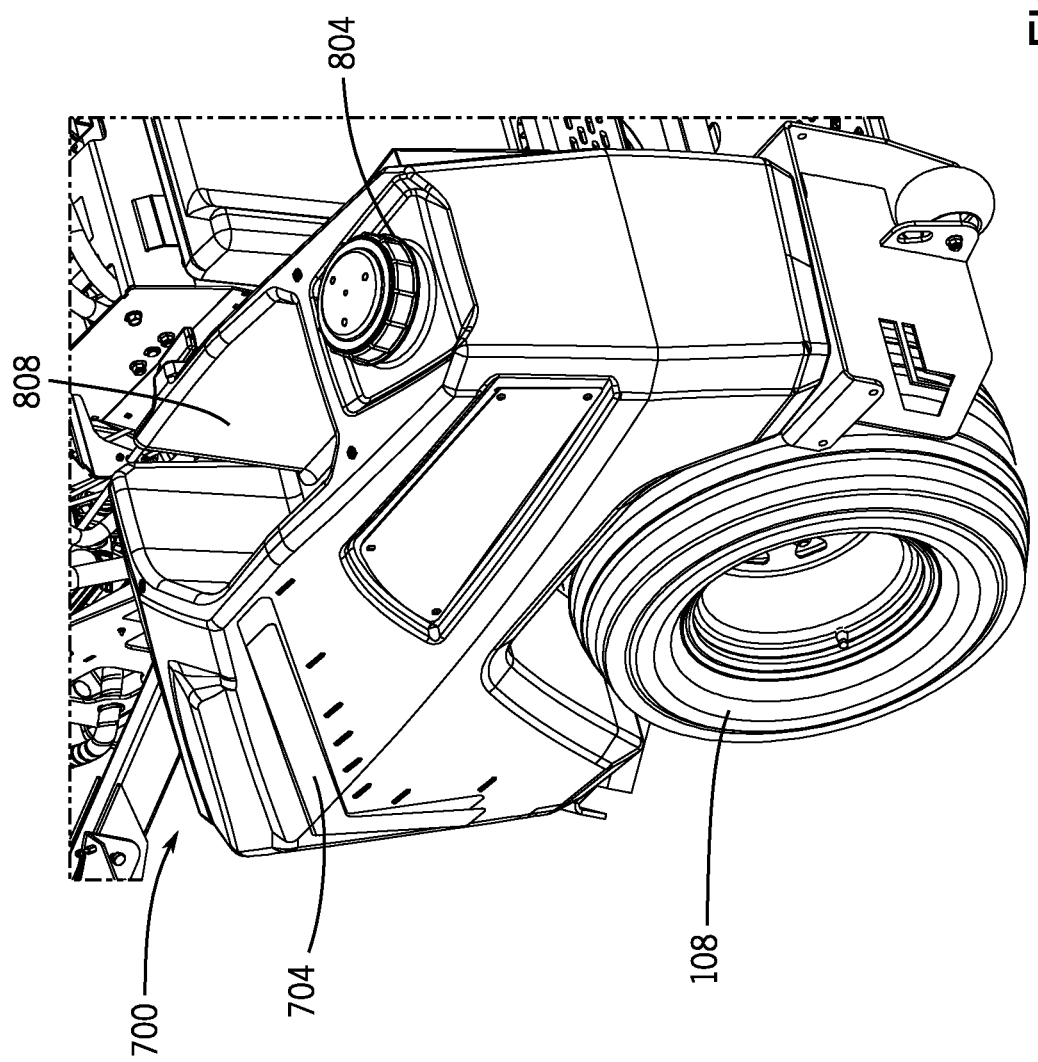
FIG. 8 is a perspective view of a chemical storage tank of the ride-on spreader/sprayer of FIG. 1.
Figure 9:
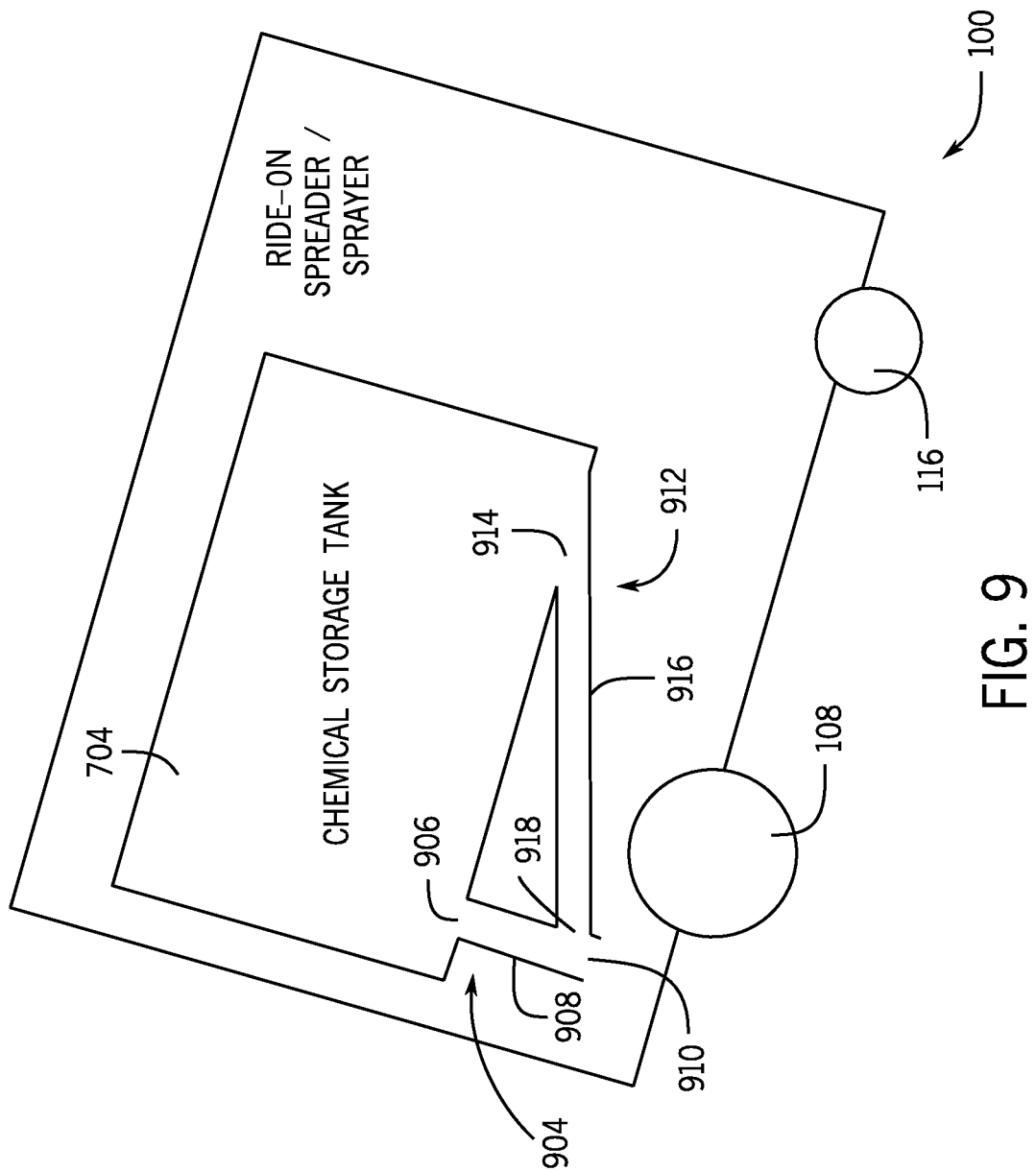
FIG. 9 is a schematic diagram of a drain channel of the sprayer system of FIG. 7.

Turning now to FIGS. 7-9, the ride-on spreader/sprayer 100 may further include a sprayer system 700. The sprayer system may include a pump 1008 having a pump motor, at least one chemical storage tank 704 (e.g., a fluid storage tank), the spray nozzles 308, a pressure regulator 1012, an extendable spray wand 708, and the hoses 312. The chemical storage tank 704 is configured to receive a corrosive fluid such as a chemical but may receive a non-corrosive fluid such as water. The chemical storage tank 704 further includes an outlet 904 through which the fluid exits the chemical storage tank 704. In some embodiments, the tank 704 includes a ball valve that opens to a specified position letting the fluid exit through the chemical storage tank at a specified flow rate. In some embodiments, the ball valve is an anti-corrosive ball valve. The chemical storage tank 704 further includes an inlet 804 through which the fluid is received. In some embodiments, the inlet 804 includes a lid that is selectively coupled to the chemical storage tank 704. The lid preventing chemicals from escaping through the inlet 804. In further embodiments, there are multiple chemical storage tanks 704. In additional embodiments, there is a pair of opposed chemical storage tanks 704. In other embodiments, the first chemical storage tank 704 of the pair of chemical storage tanks 704 is the left chemical storage tank 704 and the second chemical storage tank 704 is the right chemical storage tank 704. The opposed chemical storage tanks 704 may receive the same fluid or chemical or may not. In some embodiments, the first chemical storage tank 704 receives a first chemical or fluid and the second chemical storage tank 704 receives a second chemical or fluid. In even other embodiments, the second chemical or fluid is more valuable than the first and the second chemical storage tank 704 is further configured to conserve the second fluid or chemical.

The spray wand 708 provides a moveable device to spray the fluid with. The spray wand 708 may be fluidly coupled to the outlet of the pressure regulator 1012 and provides the fluid at a specified pressure and flow rate. The spray wand 708 allows the user to dismount the ride-on spreader/sprayer 100 and still be able to spray the fluid. The spray wand 708 may be used to spray the fluid to places the spray nozzles 308 cannot reach. For example, if the user would like to spray the fluid on a steep (>30 degrees) incline. The user could stop the ride-on spreader/sprayer 100 in front of the steep incline, dismount the spreader/sprayer 100, and use the spray wand 708 to spray the fluid on the incline. This can be useful near the water (e.g., a lake, a river, etc.) or in areas that are not mowed by lawnmowers. The spray wand 708 may contain a handle that allows the user to selectively apply the fluid based on the amount of pressure applied to the handle. For example, if the user presses the handle all the way in, the spray wand 708 may spray the fluid at a maximum flow rate. If the user does not press the handle in, the spray wand 708 may spray no fluid at all.

As shown in FIG. 8, the chemical storage tank 704 can further include a pocket (also referred to as a dry material storage volume) 808. In some embodiments, the pocket 808 is molded into the chemical storage tank 704. The pocket 808 may be sized to receive and support a dry material bag. The dry material bag containing seed, pellets, grain, or fertilizer. The pocket 808, as shown, may be located on the exterior of the chemical storage tank 704 to protect the dry material bag from the fluid and the fluid from the dry material. The pocket 808 may be located near the top of the chemical storage tank 704. In further embodiments, the pocket 808 is above at least one of the first wheels 108 or the second wheels 116. In other embodiments, the pocket 808 is located above whichever wheels is driven by the prime mover 204. By being located toward the top of the chemical storage tank 704, the pocket 808 is easier to reach and requires less bending over for a user of average height. Often the dry material bag can weigh in excess of 50 lbs and it is a common problem that the pocket 808 is located in a place that is close to the ground. By moving the pocket 808 to a relatively high position on the chemical storage tank 704, the user can easily pick up the bag and receive less strain while doing so. Further, as the pocket 808 may be located above at least one of the first wheels 108 or the second wheels 116 the weight of the dry material bag helps with gaining traction. A common problem with ride-on spreaders/sprayers is their inability to climb, traverse, and work on hills. By putting the weight of the dry material bag directly above the tires, the tires have better traction and are less likely to spin or tear up the ground while traversing a hill. This leads to better hill climbing abilities when the pocket 808 has received a dry material bag.

Referring now to FIG. 9, the chemical storage tank 704 further includes an outlet 904 and a drain channel 912. The outlet is located near the bottom of the chemical storage tank 704 and includes an outlet entrance 906, an outlet passage 908, and an outlet exit 910. The outlet entrance 906 is where the fluid exits the chemical storage tank 704 and enters the outlet 904. In some embodiments, the outlet entrance 906 selectively opens and closes such as by the opening and closing of a ball valve. In further embodiments, the outlet entrance 906 is approximately 1 inch or greater in diameter. Once the fluid has entered the outlet entrance 906, it travels through the outlet passage 908. The outlet passage 908 fluidly couples the outlet entrance 906 and the outlet exit 910. The fluid may then exit the outlet 904 through the outlet exit 910. In some embodiments, the outlet exit 910 is fluidly coupled to the pump 1008. In further embodiments, the outlet exit 910 is fluidly coupled to the sprayer valve system 1104. In some embodiments, the outlet entrance 906 is constantly open and the outlet exit 910 selectively opens and closes such as by the opening and closing of a ball valve. The drain channel 912 is located near the bottom of the chemical storage tank 704 and includes a drain entrance 914, a drain passage 916, and a drain exit 918. The drain entrance 914 is another location the fluid may exit the tank 704 and reach the outlet 904. As a result, the fluid may exit the chemical storage tank 704 from either the drain entrance 914 or the outlet entrance 906. In some embodiments, the drain entrance 914 selectively opens and closes such as by the opening and closing of a ball valve. Once the fluid enters the drain channel 912 through the drain entrance 914 it travels through the drain passage 916. The drain passage 916 fluidly couples the drain entrance 914 to the drain exit 918. In some embodiments, the drain passage 916 is located below the chemical storage tank 704 and angled so that fluid may flow through the drain passage 916 no matter the terrain the ride-on spreader/sprayer is driving on. Once the fluid has entered the drain entrance 914 and travelled through the drain passage 916, it reaches the drain exit 918. The drain exit 918 allows the fluid to flow into the outlet passage 908. The drain exit 918 leads to the outlet passage 908. In some embodiments, the drain exit 918 is a tee that connects with the outlet passage 908 and the outlet exit 910. In further embodiments, the drain passage 916 is a fluid passage with a first diameter, the outlet passage 908 is a fluid passage with the first diameter, and the outlet exit 910 is a fluid passage with a second diameter larger than the first diameter. In this way, when the outlet passage 908 connects with the drain passage 916 the two separate fluid flows combine into a single fluid flow and go into the outlet exit 910. As the outlet exit 910 may be the second, larger diameter, the fluid easily flows into the outlet exit 910.

The drain channel 912 is fluidly coupled through the drain passage 916 to the outlet 904 and is a second route the fluid may take to exit the tank 704 and reach the outlet exit 910. Therefore when the chemical storage tank 704 is nearing empty, the fluid can reach the outlet 904 through the drain passage 916. This allows the outlet 904 to be positioned lower on the ride-on spreader/sprayer 100 than on current spreaders/sprayers. Commonly, a chemical storage tank on a spreader/sprayer will be located relatively high on the spreader/sprayer and the tank outlet is positioned above or relatively near the wheel housing. This is because as a tank on a spreader/sprayer is nearing empty and the spreader/sprayer is traversing a hill, the fluid will pool to one side of the tank. This can cause a spreader/sprayer to have unused or unusable fluid or not be able to spray on hills. For example looking at FIG. 9, the ride-on spreader/sprayer 100 is shown traversing a downhill terrain. As a result, the front of the spreader/sprayer 100 is lower than the rear of the spreader/sprayer 100. Therefore the chemical storage tank 704 is angled downward as well. Because of this the fluid will pool toward the front of the spreader/sprayer 100 and cannot reach the outlet 904. However, because the fluid can also travel through the drain channel 912 through the drain passage 916, the fluid can still reach the outlet exit 910. By adding the drain channel 912, the fluid can pool to any side of the chemical storage tank 704 and still reach the outlet 904. In other embodiments, the drain channel 912 is located toward the rear of the tank 704 and the outlet 904 is located toward the front of the tank. In further embodiments, there are multiple drain channels 912 and a single outlet 904. As a result, the outlet 904 may be positioned lower (closer to the ground) on the ride-on spreader/sprayer 100 and the ride-on spreader/sprayer 100 has a lower center of gravity. A low center of gravity is important as it provides better hill climbing abilities to the ride-on spreader/sprayer 100, allowing the spreader/sprayer 100 to be used in more terrains, situations, and in different loading configurations without the threat of tipping.

As the spreader/sprayer 100 has larger tires than common, the lower positioned chemical storage tank 704, an asymmetrical hopper 504 where the first hopper end 508 is lower than the second hopper end 512, and a pocket 808 above the first wheels 108 or 116, the ride-on spreader/sprayer 100 has a significantly better hill climbing ability than current ride-on spreaders/sprayers. The lower positioned chemical storage tank 704 and the asymmetrical hopper 504 provide a lower center of gravity helping the ride-on spreader/sprayer 100 from tipping while on a hill and more weight on the first wheels 108 and the second wheels 116. Furthermore, the ride-on spreader/sprayer has an increase in traction due to the extra weight above the drive wheels and the larger than average tires. As a result, the ride-on spreader/sprayer 100 can climb steeper hills, properly brake going down steep hills, and more evenly spreads the fluid on varying terrains compared to current commercial spreader/sprayers. As it is better at traversing hills, the ride-on spreader/sprayer 100 may be used in more situations, provides better commercial utility, and allows the user to spread and spray in a variety of terrains.

Figure 10:
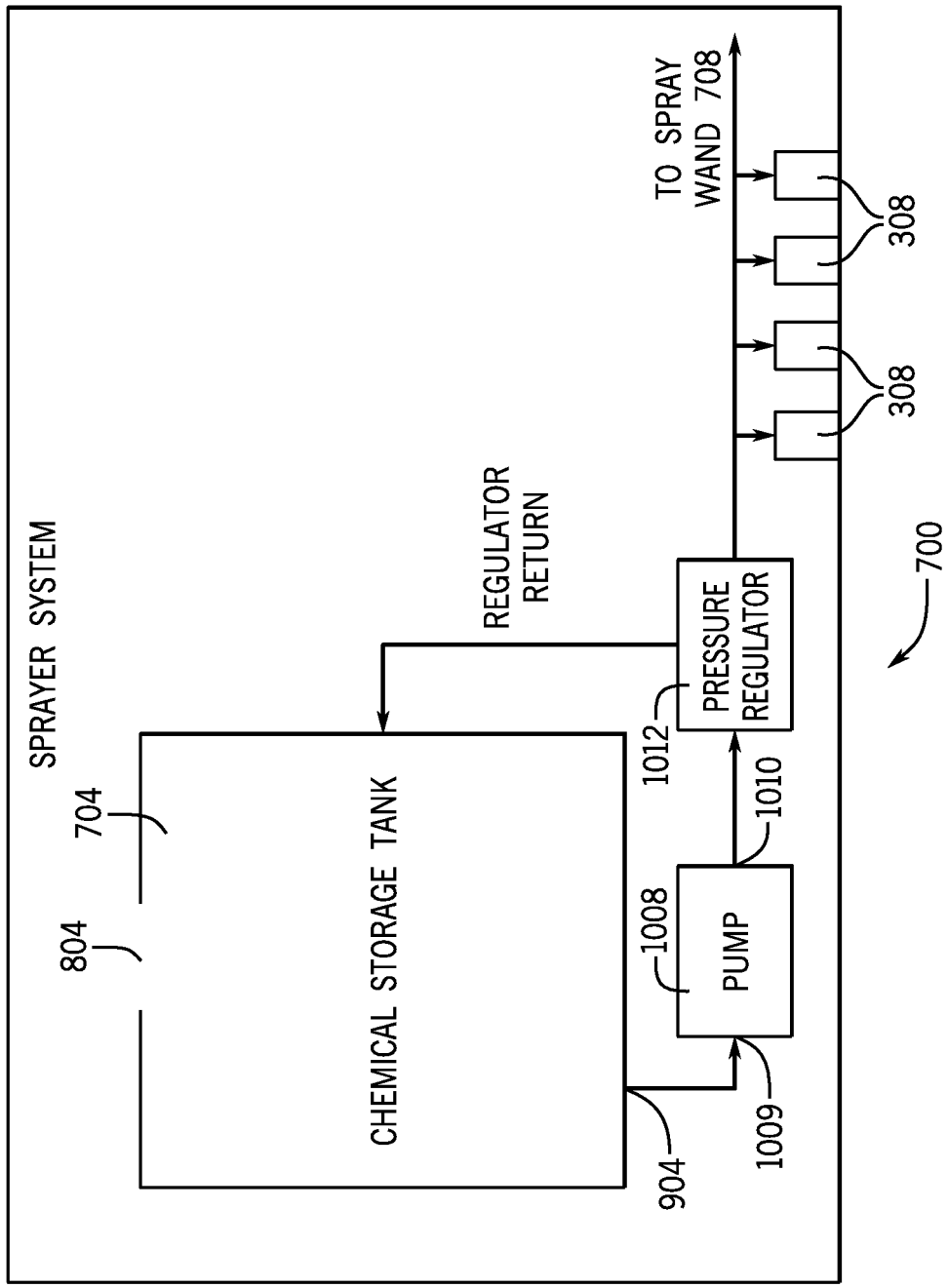
FIG. 10 is a schematic diagram of the sprayer system of FIG. 7.

Referring to FIG. 10, the pump 1008 is shown, according to some embodiments. In one embodiment, the pump 1008 is a positive displacement pump, driven by a pump motor. The pump 1008 includes a pump inlet 1009 and a pump outlet 1010. The pump 1008 may be fluidly coupled to the chemical storage tank 704. Fluid flowing from the chemical storage tank 704 flows into the pump 1008 at the pump inlet 1009 and exits the pump 1008 at the pump outlet 1010. In some embodiments, the fluid flows through a sprayer valve system 1104 before entering the pump inlet 804. The pump 1008 is configured to pressurize the fluid, such as by converting the reciprocating action of a diaphragm to an increased static pressure of the water flow and, in turn, increasing a related pressure and a flow velocity with which the water or combined flow exits the ride-on spreader/sprayer 100. While the pump 1008 is described as a reciprocating-type positive displacement pump, other embodiments utilize other styles of pumps, including centrifugal-type pumps and/or rotary-type positive displacement pumps.

Pressurized fluid flow exits from the pump 1008 through the pump outlet 910 and into the pressure regulator 1012. The pressure regulator 1012 includes a flow restrictor providing variable restriction to the fluid flow through the pressure regulator 1012. The pressure regulator 1012 responds to manual control from the operator. In some embodiments, the pressure regulator 1012 is configured to respond to signals from a controller as described further herein to maintain or adjust a desired downstream flow rate and pressure of fluid flow through the sprayer system 700. In further embodiments, the pressure regulator 1012 is a diaphragm regulator that allows fluid to pass through the regulator 1012 until the pressure differential between the inlet of the regulator 1012 and the outlet of the regulator 1012 reaches a certain value. This type of regulator requires no external inputs. After the fluid exits the pressure regulator 1012, the fluid may be broken into two separate flow paths. The fluid that was allowed to pass by the pressure regulator 1012 flows to the mutliple spray nozzles 308. The fluid that was not allowed to pass is returned to the chemical storage tank 704. In some embodiments, the fluid flows through the sprayer valve system 1104 before entering the chemical storage tank 704. Once the fluid reaches the spray nozzles 308, the fluid is sprayed out at a specified velocity and pattern. In some embodiments, the spray nozzles 308 are controlled by solenoids. The solenoids are coupled to the spray nozzles 308 to selectively open or close the spray nozzles 308. In some embodiments, the solenoids open or closed based on the pressure of the fluid. In further embodiments, the solenoids are communicably coupled to the controller and open and close as directed by the controller.

The hoses 312 fluidly couple the many components of the sprayer system 700. In some embodiments, the hoses 312 are made of an anti-corrosive material. In further embodiments, the hoses 312 are multiple pipes through which the fluid travels. The hoses 312 may further includes multiple items to couple multiple hoses 312 together such as band-clamps, three way connectors, and further fittings used with fluids. In some embodiments, the hoses 312 are rated up to and above the average pressure used within the sprayer system. This includes but is not limited to hoses rated to 1, 2, 4, 8, 15, and 30 PSI. In further embodiments, the hoses 312 are specifically designed to be used with fertilizer.

Figure 11:
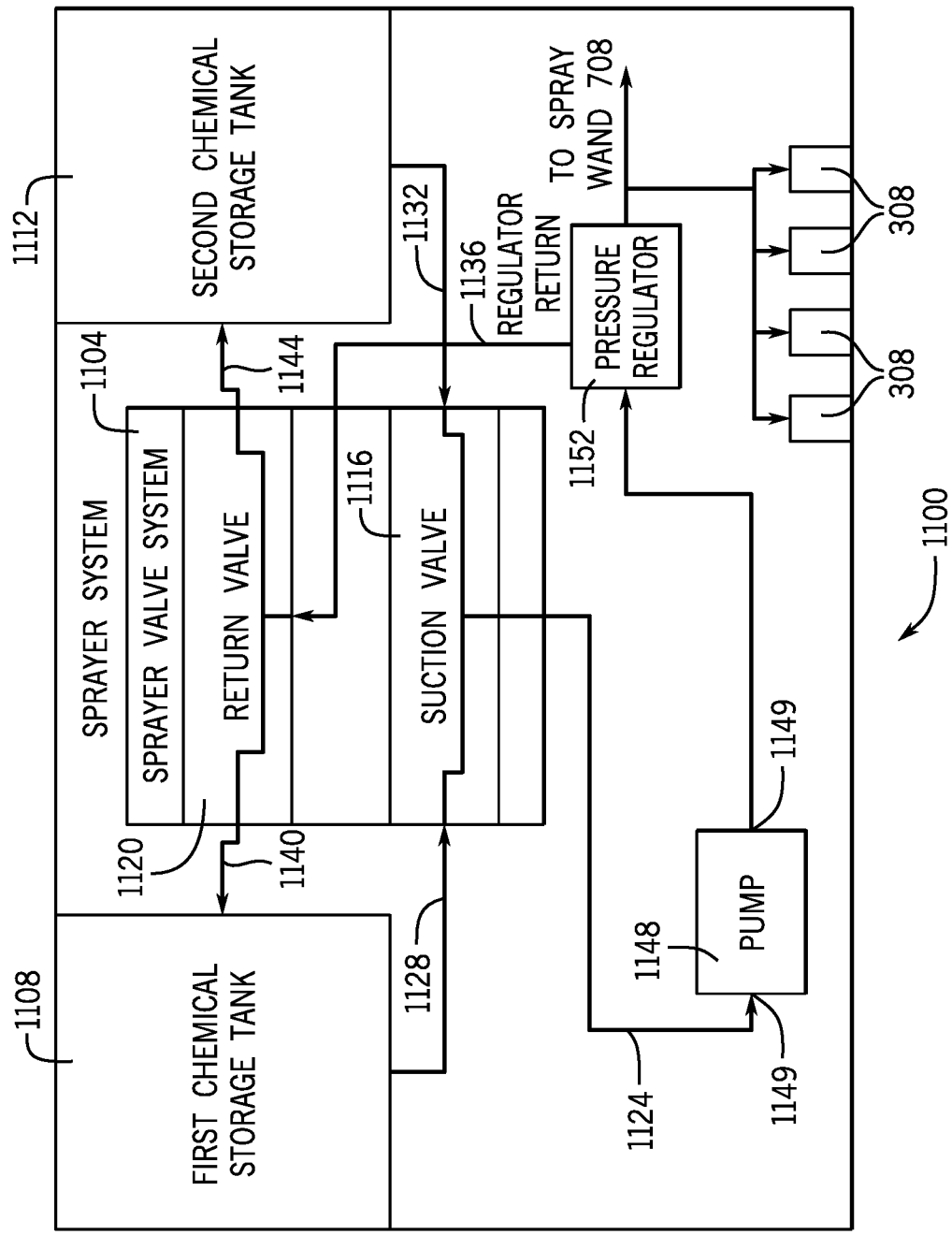
FIG. 11 is a schematic diagram of an alternative sprayer system of the ride-on spreader/sprayer of FIG. 1.
Figure 12:
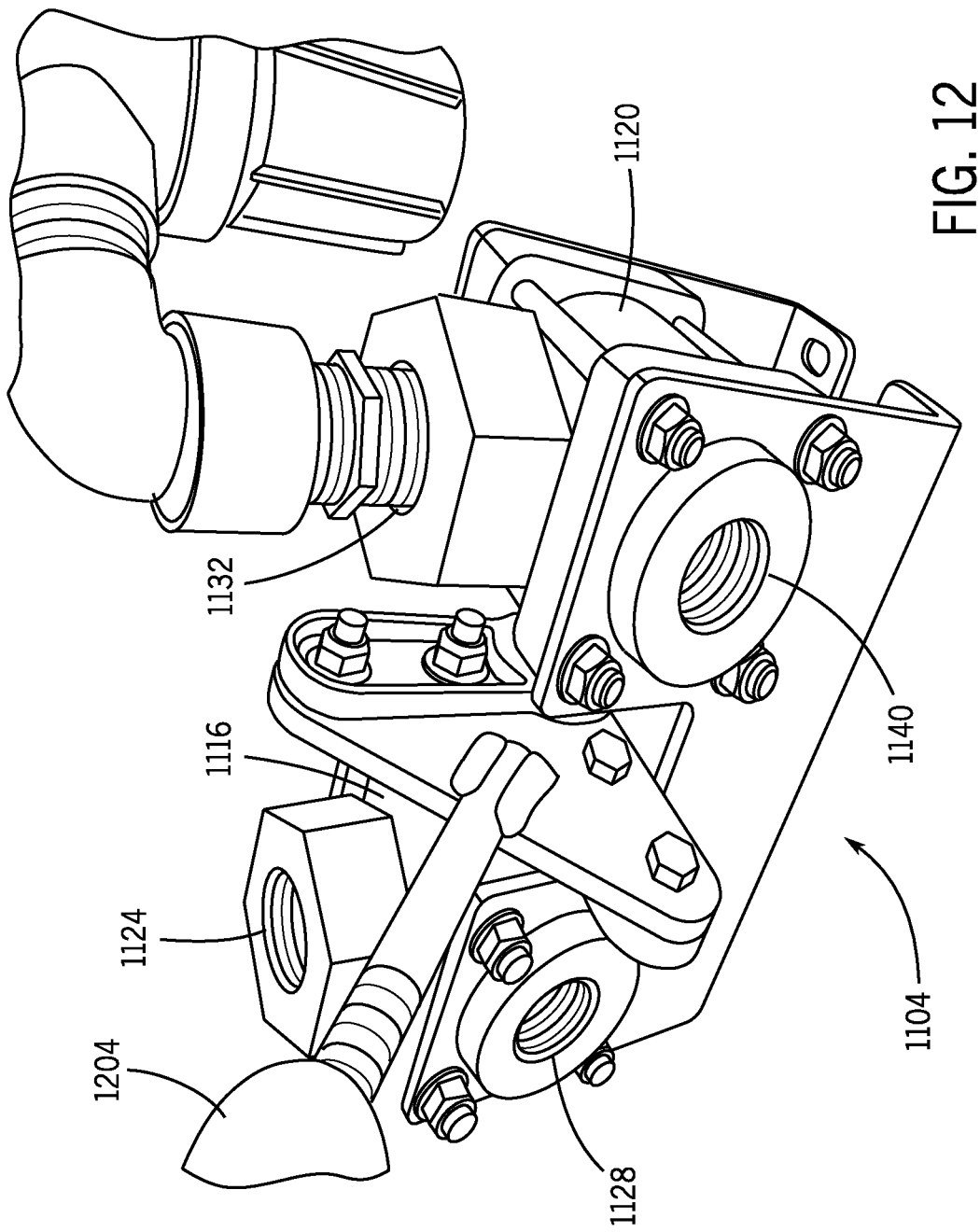
FIG. 12 is a perspective view of a sprayer valve system of the ride-on spreader/sprayer of FIG. 1.

Referring to FIGS. 11-12, a sprayer system 1100 is shown, according to an exemplary embodiment. The sprayer system 1100 may operate similar to sprayer system 700, but further includes a sprayer valve system 1104 and includes a first chemical storage tank 1108 and a second chemical storage tank 1112 to replace the single storage tank 704. The sprayer valve system 1104 may include a first three way valve 1116 and a second three way valve 1120. The first three way valve 1116, also referred to as the suction valve, includes a fluid pathway referred to as the suction pathway 1124, the suction pathway 1124 leading to the pump inlet and selectively moving between a fully open and a closed position. The suction pathway (also referred to as the third suction pathway) 1124 may receive the fluid from at least one of the first tank suction pathway 1128 and the second tank suction pathway 1132. The first tank (also referred to as the first) suction pathway 1128, a fluid pathway to the first chemical storage tank 1108 that selectively moves between a fully open and a closed position. The second tank (also referred to as the second) suction pathway 1132, a fluid pathway to the second chemical storage tank 1112 that selectively moves between a fully open and a closed position. The second three way valve 1120, also referred to as the return valve, includes a fluid pathway referred to as the return pathway 1136, the return pathway 1136 leading to the pump outlet and selectively moving between a fully open and a closed position. The return pathway (also referred to as the third return pathway) 1136 may provide the fluid to at least one of the first tank return pathway 1140 and the second tank return pathway 1144. The first tank (also referred to as the first) return pathway 1140, a fluid pathway to the first chemical storage tank 1108 that selectively moves between a fully open and a closed position. The second tank (also referred to as the second) return pathway 1144, a fluid pathway to the second chemical storage tank 1112 that selectively moves between a fully open and a closed position. In some embodiments, the first three way valve 1116 is a three way ball valve and the first tank suction pathway 1128, the second tank suction pathway 1132, and the suction pathway 1124 all have infinite positions between fully open and closed that they may be selectively moved to by moving a ball or other valve member into positions that open or close the different pathways. In further embodiments, the second three way valve 1120 is a three way ball valve and the first tank return pathway 1140, the second tank return pathway 1144, and the return pathway 1136 all have infinite positions between fully open and closed that they may be selectively moved to.

The sprayer valve system 1104 may further include a selector 1204. The selector 1204 moving between a first control position 1301, a second control position 1302, and a third control position 1303 (all three are shown in FIG. 12). The selector 1204 controlling both the first three way control valve 1116 and the second three way control valve 1120. In some embodiments, the selector 1204 is a lever that moves between a first lever position, a second lever position, and a third lever position corresponding to the three control positions. In further embodiments, the selector 1204 is a slide control that slides between the first control position 1301, the second control position 1302, and the third control position 1303. The second control position 1302 being between the first control position 1301 and the third control position 1303. In additional embodiments, the selector 1204 is infinitely positionable between the first control position 1301 and the third control position 1303 with the second control position 1302 being the exact middle of the first control position 1301 and the third control position 1303. In even other embodiments, the selector 1204 is a selection knob that moves between an infinite number of control positions between the first control position 1301 and the third control position 1303 and with the second control position 1302 being the exact center between the first control position 1301 and the third control position 1303. The selection knob may further be communicably coupled to a controller that communicates the position of the selection knob.

When moving between any of the control positions the selector 1204 controls both the first three way valve 1116 and the second three way valve 1120. In doing so, the selector also controls the suction pathway 1124, the first tank suction pathway 1128, the second tank suction pathway 1132, the return pathway 1136, the first tank return pathway 1140, and the second tank return pathway 1144. In some embodiments, the selector 1204 indirectly controls the first three way valve 1116 and the second three way valve 1120 such as through the use of an actuator. In further embodiments, the selector 1204 physically controls the first three way valve 1116 and the second three way valve 1120.

The first control position 1301 is shown in FIG. 12. When moved to the first control position 1301, the selector 1204 sets the suction pathway 1124 to the fully open position, the first tank suction pathway 1128 to the fully open position, the second tank suction pathway 1132 to the closed position, the return pathway 1136 to the fully open position, the first tank return pathway 1140 to the fully open position, and the second tank return pathway 1144 to the closed position. This allows the fluid to enter and exit the first chemical storage tank 1108 and does not allow fluid to enter or exit the second chemical storage tank 1112.

The second control position 1302 is shown in FIG. 12. When moved to the second control position 1302, the selector 1204 sets the suction pathway 1124 to the fully open position, the first tank suction pathway 1128 to a position between the fully open and the closed position, the second tank suction pathway 1132 to a position between the fully open and the closed position, the return pathway 1136 to the fully open position, the first tank return pathway 1140 to a position between the fully open and the closed position, and the second tank return pathway 1144 to a position between the fully open and the closed position. This allows half of the fluid flowing to enter and exit from the first chemical storage tank 1108 and half to enter and exit from the second chemical storage tank 1112.

The third control position 1303 is shown in FIG. 12. When moved to the third control position 1303, the selector 1204 sets the suction pathway 1124 to the fully open position, the first tank suction pathway 1128 to the closed position, the second tank suction pathway 1132 to the fully open position, the return pathway 1136 to the fully open position, the first tank return pathway 1140 to the closed position, and the second tank return pathway 1144 to the fully open position. This allows the fluid to enter and exit the second chemical storage tank 1112 and does not allow fluid to enter or exit the first chemical storage tank 1108.

The sprayer valve system 1104 is used to switch between use of the first chemical storage tank 1108 and the second chemical storage tank 1112. Often, in operation, the user may fill up the first tank 1108 and the second tank 1112 with two separate fluids or chemicals. The user may then want to switch between the two separate fluids while riding or using the ride-on spreader/sprayer 100. Often, on typical spreaders/sprayers, instead of simply flipping a switch or a selector such as the selector 1204, the user has to get off the spreader/sprayer and manually switch the valves. This often requires the operation of up to four separate switches which is overly complex and slow. The sprayer valve system 1104 solves this problem through the use of the selector 1204 to control the first three way valve 1116 and the second three way valve 1120. Instead of having to get off of the ride-on spreader/sprayer 100, the user can access the selector 1204 at hands reach and simply move the selector to the wanted position. If the user wants to use the first fluid in the first chemical storage tank 1108, the user can move the selector to the first control position 1301. If the user wants to use the second fluid in the second chemical storage tank 1112, the user can move the selector 1204 the third control positon 1303. If the user wants to use an equal amount of both fluids from both the first chemical storage tank 1108 and the second chemical storage tank 1112, the user can move the selector 1204 to the second control position 1302. More so as the selector 1204 may be moved to an infinite number of positions between the first control positon 1301 and the third control positon 1303, the user can finely control what percentage of fluid they want from the first chemical storage tank 1108 and the second chemical storage tank 1112. For example, if the user has an expensive fluid in the second chemical storage tank 1112 and an inexpensive fluid in the first chemical storage tank 1108, the user may move the selector to a position in between the first control position 1301 and the second control position 1302. This means that more fluid is coming from the first chemical storage tank 1108 than from the second chemical storage tank 1112, conserving the expensive fluid.

Figure 13:
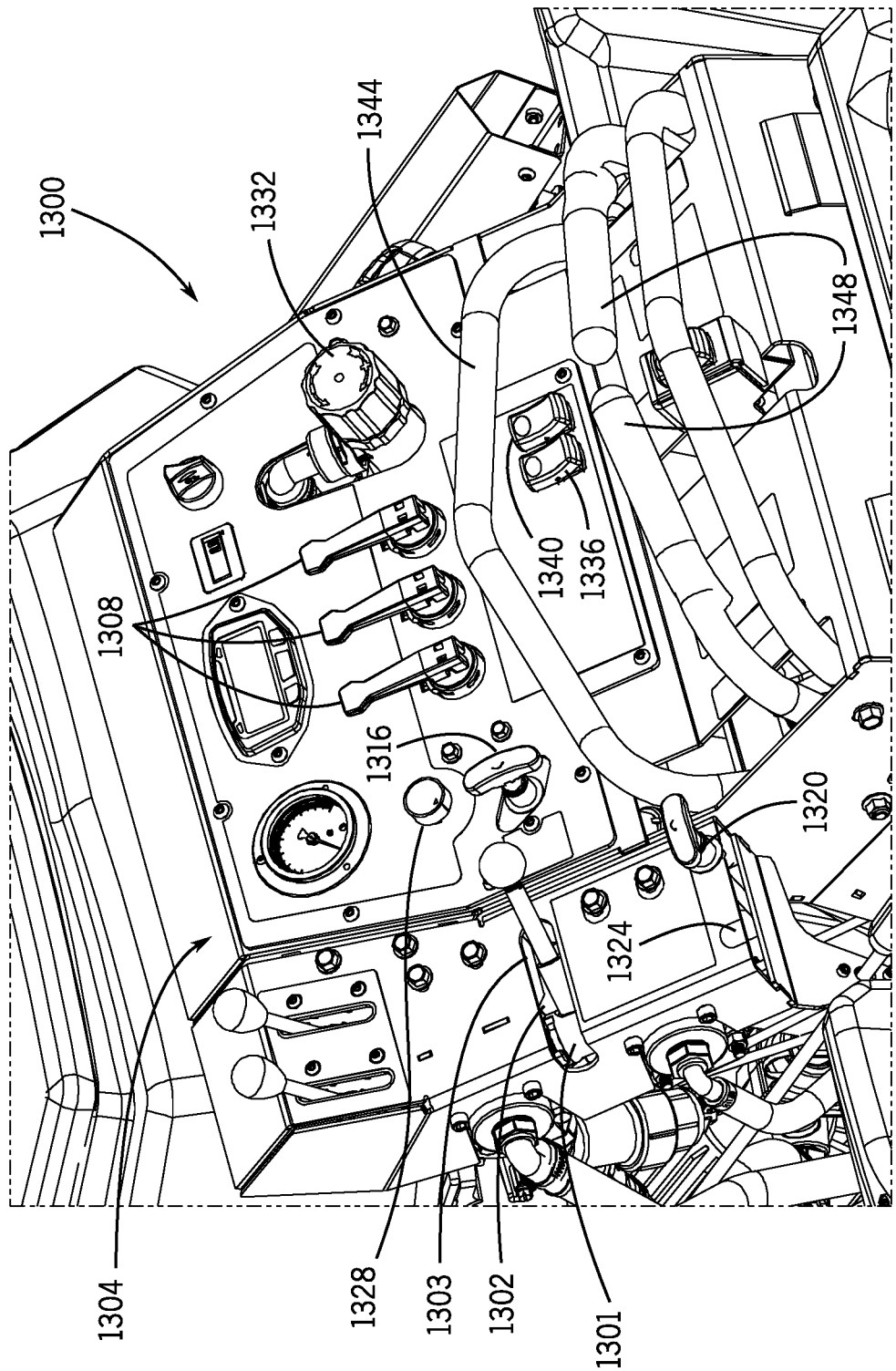
FIG. 13 is a perspective view of a user interface of the ride-on spreader/sprayer of FIG. 1.
Figure 14:
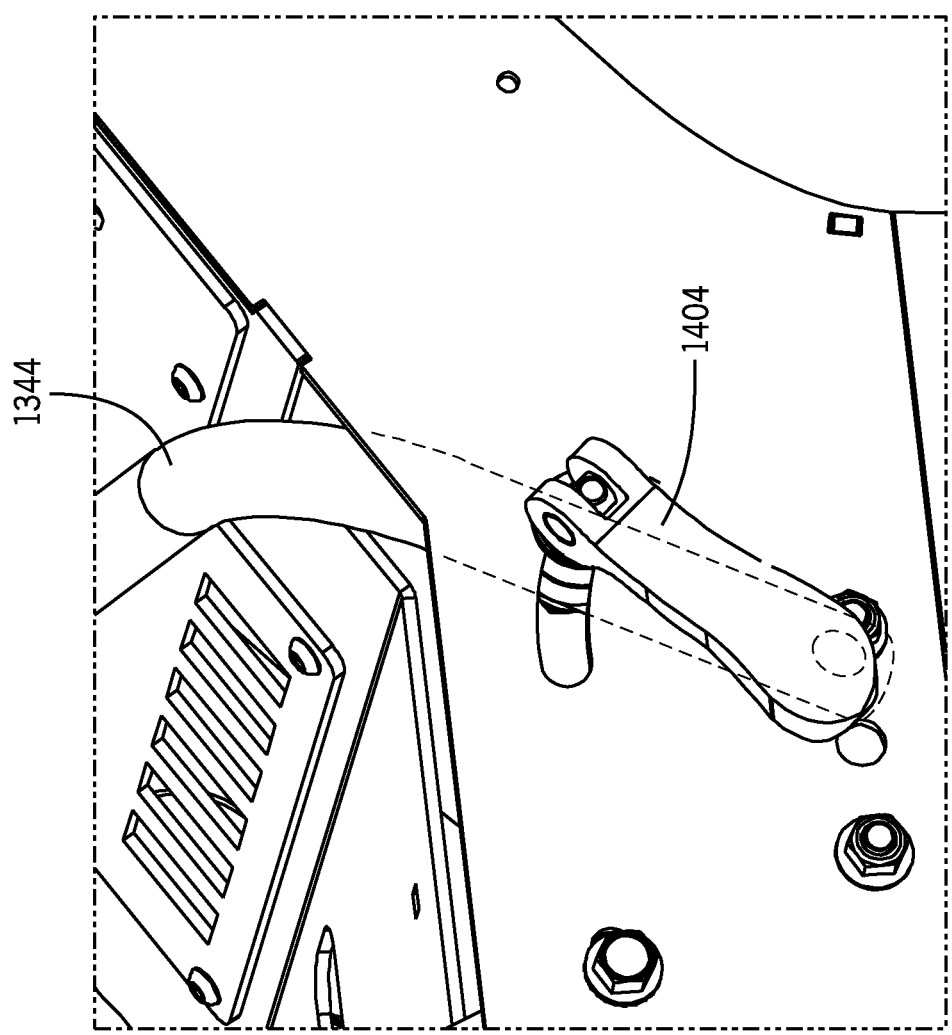
FIG. 14 is a side perspective view of an adjustable hand stop of the ride-on spreader/sprayer of FIG. 1.

Referring to FIGS. 13-14, one embodiment of user interface 1300 is shown, according to an exemplary embodiment. User interface 1300 is shown to include a display screen 1304, multiple nozzle on/off buttons 1308, a hopper gate turn handle 1316, a pattern control turn handle 1320, a trim shield switch 1324, a spinner speed knob 1328, a sprayer pressure adjustment knob 1332, a shaker on-off switch 1336, a spreader motor 506 on-off switch 1340, a speed limiting handle 1344, two drive handles 1348, and the selector 1204 among other components. Display screen 1304 may include a touch screen and/or multiple of user inputs, in which a user can manually input specific details about the location, maximum speed, chemical usage, chemical type and other details regarding the spreader/sprayer 100. Display screen 1304 may further provide information to the user such as the speed of the ride-on spreader/sprayer 100, relevant information on the prime mover 204, or the pressure of the sprayer system 700. The multiple nozzle on/off buttons 1308 are configured to control the solenoids which may prevent fluid flow through the spray nozzles 308. Using the nozzle on/off button 1308, a user may selectively turn on and off the individual spray nozzles 308 to control when and where the sprayer system 700 releases the fluid. As seen in FIG. 13, there is a left, right, and center nozzle on/off buttons 1308, configured to control the left, right, and center spray nozzles 308 accordingly. In other embodiments, a different number of nozzle on/off buttons 1308 may be used. In some embodiments, the user interface 1300 may be organized such that the granular controls, i.e. for the spreader system 500 are located in one area and the liquid controls, i.e. for the sprayer system 700, are located in a separate area, to provide for ease of use for the user.

The sprayer pressure adjustment knob 1332 is configured to adjust the pressure of the sprayer system 700. In some embodiments, the sprayer pressure adjustment knob 1332 directly controls the pressure regulator 1012. In further embodiments, the sprayer pressure adjustment knob 1332 indirectly controls the pressure regulator 1012 such as by communicating to the controller, which directly controls the pressure regulator 1012. The adjustment knob 1332 may further have a maximum allowable pressure and a minimum allowable pressure. The selector 1204 works as described previously, operating the sprayer valve system 1104 and selecting if the fluid is provided by the first chemical storage tank 1108, the second chemical storage tank 1112, or both.

The hopper gate turn handle 1316 is configured to allow a user to control the degree as to which the gate 604 is opened. The gate 604 may be fully open, partially open, or closed, and may be manually controlled by the user via hopper gate turn handle 1316, to allow a varying degree of the dry material to be distributed. The pattern control turn handle 1320 is configured to allow the user to control the distribution pattern of the dry material by the spinner 408. The trim shield switch 1324 is configured to allow a user to enable a shield to block a certain side or section of the ride-on spreader/sprayer 100 from distributing dry material from the hopper 504 to that side. The spinner speed knob 1328 is configured to allow a user to manually control a speed of the spinner 408, which in turn may affect the amount of dry material distributed by the ride-on spreader/sprayer 100 as well as the width and distance of which the spinner 408 is capable of distributing the dry material to. The shaker on-off switch 1336 is configured to turn the shaker on or off. The shaker may be provided power as a result of the on-off switch 1336 being pushed to on. The spreader motor 506 on-off switch 1340 is configured to turn the spreader motor 506 on or off. The spreader motor 506 may be provided power as a result of the on-off switch 1340 being pushed to on.

The user interface 1300 further includes the drive handles 1348. The drive handles 1348 are two separate handles (one left and one right) configured to drive the drive wheels of the rider/sprayer 100. Herein, left and right will correspond to the left and the right of the view of FIG. 13. For example in the FIG. 13, the sprayer pressure adjustment knob 1332 is on the right side of the spreader/sprayer 100. In the embodiment shown, the drive wheels are the first wheels 108. In further embodiments, the drive wheels may be the second wheels 116. The drive handles 1348 are operatively coupled to a transmission of the ride-on spreader/sprayer 100 and allow the user to control drive operations of the spreader/sprayer 100. For example, if the both handles 1348 receives a forward force from the user, the transmission will apply a forward torque on both wheels 108 and the spreader/sprayer 100 will drive forward. In some embodiments, each drive handle 1348 controls the drive wheel corresponding to the drive handle 1348. For example, the right drive handle 1348 may control the right wheel 108 and the left drive handle 1348 may control the left wheel 108. The speed of the ride-on spreader/sprayer 100 is dependent on how far the drive handles 1348 are pushed forward or rearward. For example, if the drive handles 1348 are both pushed as far forward as is possible, both wheels 108 will receive maximum torque from the transmission leading to maximum acceleration of both wheels 108, and maximum speed over time of the ride-on spreader/sprayer 100. The drive handles 1348 are also used to steer the ride-on spreader/sprayer 100. For example, if a user wants to turn right, they will apply a force to the left drive handle 1348 and little to no force to the right drive handle 1348. As a result, the left wheel 108 will receive a torque forward from the transmission, and the right wheel 108 will receive little to no torque. Therefore as the left wheel 108 is moving forward and the right wheel 108 is not, the ride-on spreader/sprayer will turn right. As each wheel 108 (drive wheel) may operate independently of one another, the ride-on spreader/sprayer 100 is able to turn in place, similar to a zero turn lawnmower or a skid-steer loader.

Referring now to FIGS. 13-14, the user interface 1300 further includes the speed limiting handle 1344 and an adjustable hand stop 1404. The speed limiting handle 1344 and the adjustable hand stop 1404 work together to allow the user to finely control and limit the speed of the ride-on spreader/sprayer 100. The speed limiting handle 1344 is selectively located so as to partially block the drive handles 1348. The speed limiting handle 1344 is allowed to freely move when the adjustable hand stop 1404 is not providing a limiting force to the speed limiting handle 1344. When flipped out (as shown), the adjustable hand stop 1404 has no effect on the speed limiting handle 1344 and allows it to move freely. However when flipped up, the adjustable hand stop 1404 prevents the speed limiting handle 1344 from moving. As the speed limiting handle 1344 may block the drive handles 1348, it may limit their forward motion as to set a new maximum speed for the ride-on spreader/sprayer 100. Therefore when the user finds a wanted speed, the user can locate the speed limiting handle 1344 in the correct location, flip the adjustable hand stop 1404, and lock the speed limiting handle 1344 in place. Therefore the drive handles 1348 have a set maximum speed.

An important aspect of ride-on spreaders/sprayers is application speed. As the fertilizer or other chemicals a spreader/sprayer sprays can be expensive it is important to provide an even and throughout coat. To do this, the user has to finely balance the sprayer pressure, the sprayer flow rate, and the speed of the spreader/sprayer. Commonly, to set the speed of a spreader/sprayer a set screw is used. The set screw is either screwed in to set the speed of the spreader/sprayer or unscrewed to allow the user to adjust the speed of the spreader/sprayer. The set screw however is often small and hard to finely control while the user is also operating the spreader/sprayer. In some spreader/sprayers, the user must have a specialized tool to set the set screw and therefore if the user does not have the tool, the user cannot set the speed. This is overly complicated and hard to use. The adjustable hand stop 1404 allows a user to easily set the speed of the spreader/sprayer 100 through the flip of a cam lever. When the user finds the specified speed using the speed handle 1344, they flip the adjustable hand stop 1404 and can keep a consistent speed through the entirety of the spraying process. This is also true for spreading. Providing an easy to use, simple to understand speed control for the spreader/sprayer 100. In further embodiments, the spreader/sprayer 100 includes two speed limiting handles 1344 and two adjustable hand stops 1404. One speed limiting handle 1344 and adjustable hand stop 1404 controlling forward movement and another speed limiting handle 1344 and adjustable hand stop 1404 controlling rearward movement.

Figure 15:
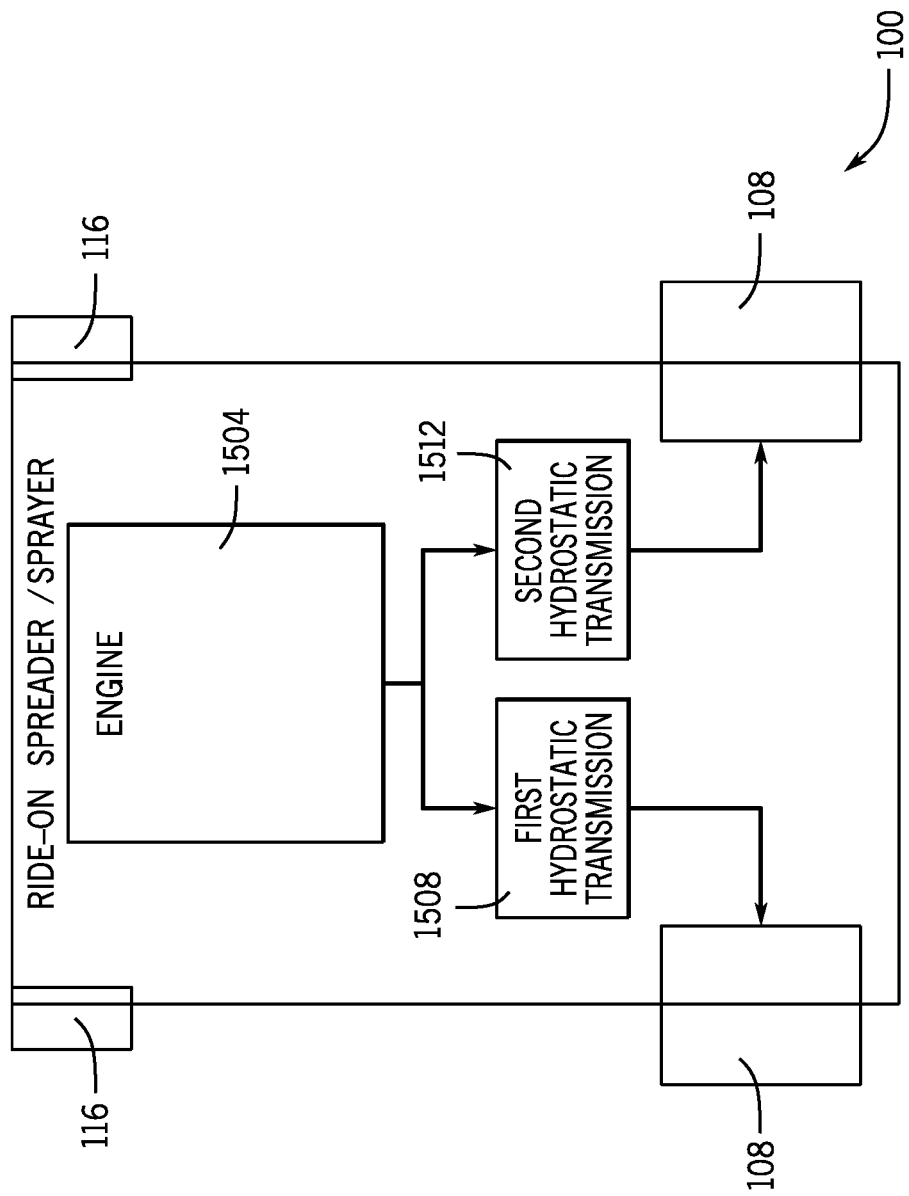
FIG. 15 is a schematic diagram of a transmission that may be implemented in the ride-on spreader/sprayer of FIG. 1.
Figure 16:
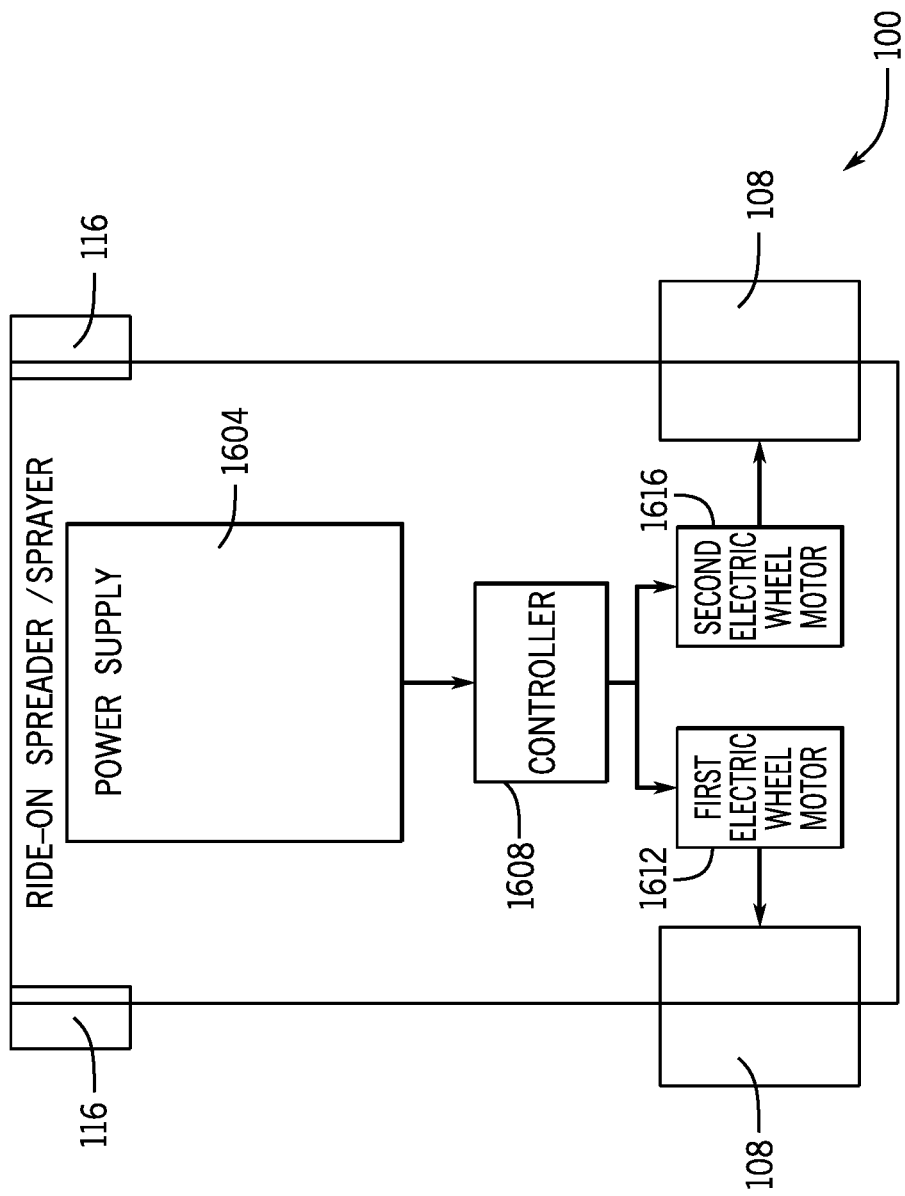
FIG. 16 is a schematic diagram of an alternative transmission that may be implemented in the ride-on spreader/sprayer of FIG. 1.

Referring now to FIGS. 15-16, two examples of a transmission are shown. A first hydrostatic transmission 1508 and a second hydrostatic transmission 1512 are shown in FIG. 15. The transmission is operatively coupled to the drive handles 1348 and receives a torque from the engine 1504. The engine 1504 (while running) is constantly supplying a torque to the first hydrostatic transmission 1508 and the second hydrostatic transmission 1512. As the drive wheels (the first wheels 108) do not require a constant torque, the first hydrostatic transmission 1508 and the second hydrostatic transmission 1512 transform the constant torque into a selectively applied torque. For example, if the left drive handle 1348 commands the first (left) hydrostatic transmission 1508 move the left wheel 108 forward, the first hydrostatic transmission 1508 transforms the torque provided by the engine 1504 into a selective torque and drives the left wheel 108 forward. In this way, the first transmission 1508 operates independently of the second transmission 1512 to operate the first wheels 108. In further embodiments, the first hydrostatic transmission 1508 and the second hydrostatic transmission 1512 are coupled to the engine 1504 through a drive belt The controller 1608 is similar to the first and second hydrostatic transmission 1508 and 1512 of FIG. 1, but does not require a torque input. The controller 1608 is operatively coupled to the drive handles 1348 and receives power from (e.g. is electrically coupled to) the power supply 1604. The power supply 1604 (while running) constantly provides power to the controller 1608. The controller 1608 then selectively provides that power to the first electric wheel motor 1612 or the second wheel motor 1616. When a command is received from the respective drive handle 1348, the controller provides power to the respective motor 1612 or 1616. For example, if the left drive handle 1348 commands the controller 1608 to move the left wheel 108 forward, the controller 1608 provides the first (left) electric wheel motor 1612 with power, the first wheel electric wheel motor 1612 uses the provided power to generate a torque on the left wheel 108, driving the left wheel forward. In this way, the first electric wheel motor 1612 operates independently of the second electric wheel motor 1612 to operate the first wheels 108. In further embodiments, the power supply 1604 further includes an inverter providing power to the controller 1608 through the use of wired connections. In other embodiments, there is two separate controllers 1608. A first controller 1608 operatively coupled to the left drive handle 1348, electrically coupled to the power supply 1604, and communicably coupled to the first electric wheel motor 1612. A second controller 1608 operatively coupled to the right drive handle 1348, electrically coupled to the power supply 1604, and communicably coupled to the second electric wheel motor 1616.

The controller 1608 may further be communicably coupled to the user interface 1300, the sprayer system 700, and the spreader system 500. The controller 1608 handling all user input to the various different systems. The controller 1608 may receive user input from the user interface 1300 and apply the input to the various systems. For example, the user may input an increase in the spinner 408 speed through use of the spinner speed knob 1328. The user interface 1300 may then provide the controller 1608 with this information. At this point, the controller 1608 may increase the speed of the spreader motor 506. The controller 1608 may further include multiple circuits to handle the various responsibilities. For example, the controller 1608 may further includes a speed sensing circuit. The speed sensing circuit may be configured to receive sensed values from the speed sensors and communicate the sensed speed values to the display screen 1304. The display screen 1304 may then display the speed of the ride-on spreader/sprayer 100 to the user. In other embodiments, the controller 1608 includes a spreader circuit configured to control the spreader system 500, a sprayer circuit configured to control the sprayer system 700, a prime mover circuit configured to control the prime mover 204, a drive circuit configured to control the first electric wheel motor 1612 and the second electric wheel motor 1616, and an input/output circuit configured to receive and output all important information. The controller 1608 may be communicably coupled to the user interface 1300, the sprayer system 700, the spreader system 500, and the prime mover 204 by multiple wires. The wires may be configured to resist corrosion. In further embodiments, the wires have a submerged water rating of IP 67. In even other embodiments, the entire electrical system of the ride-on spreader/sprayer 100 has a submerged water rating of IP 67.

Figure 17:
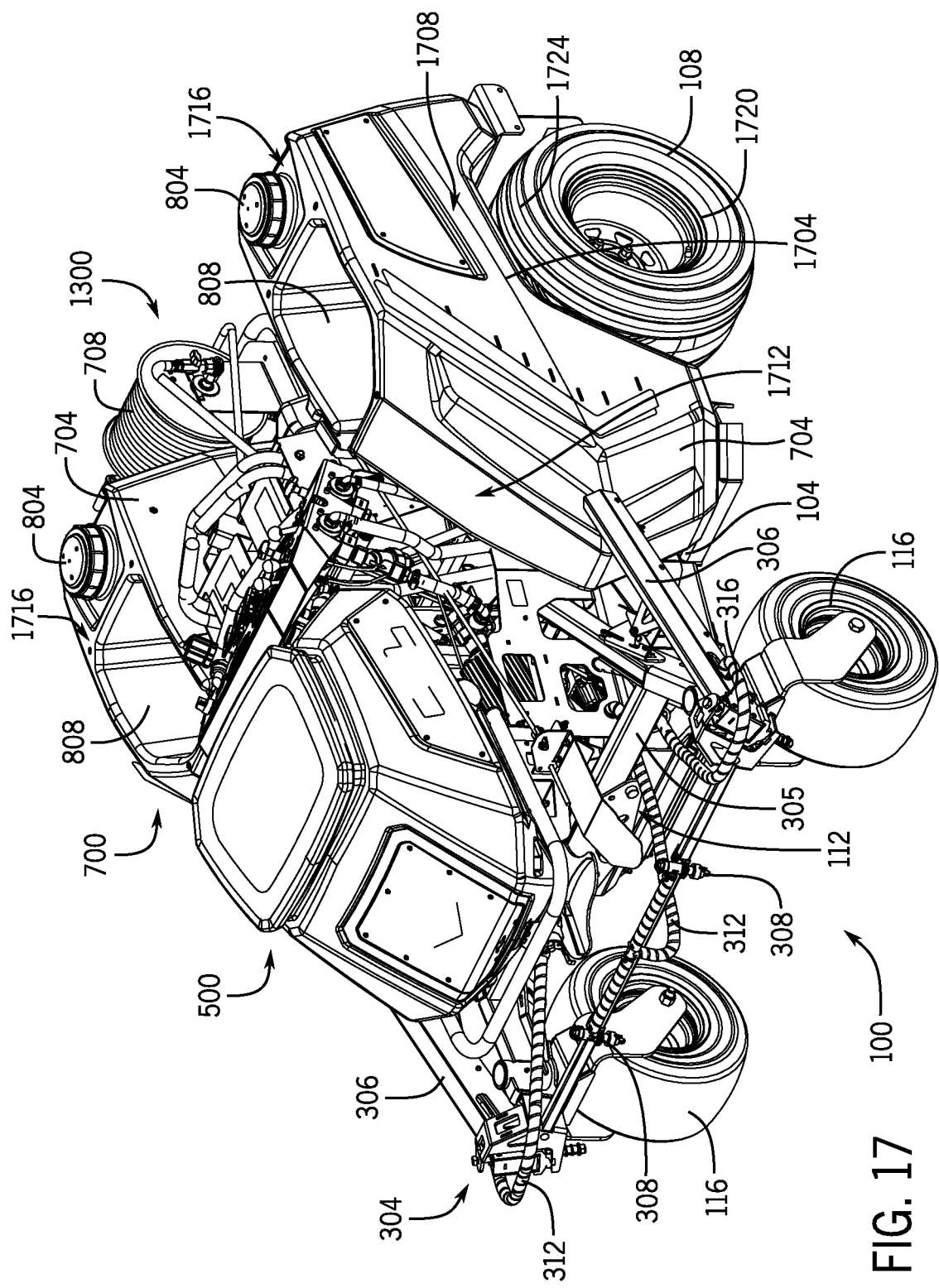
FIG. 17 is another front perspective view of the ride-on spreader/sprayer of FIG. 1.
Figure 18:
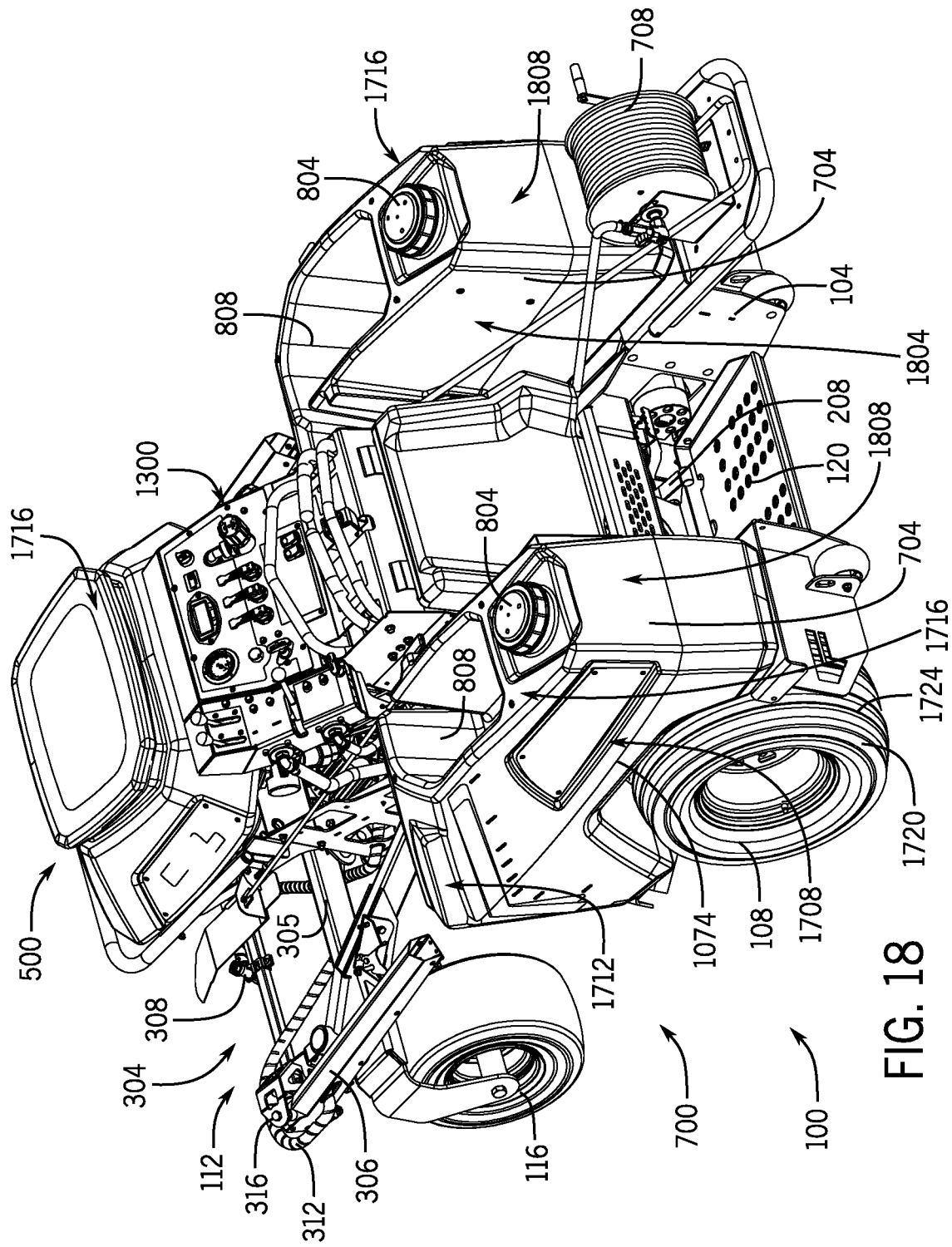
FIG. 18 is another rear perspective view of the ride-on spreader/sprayer of FIG. 1.
Figure 19:
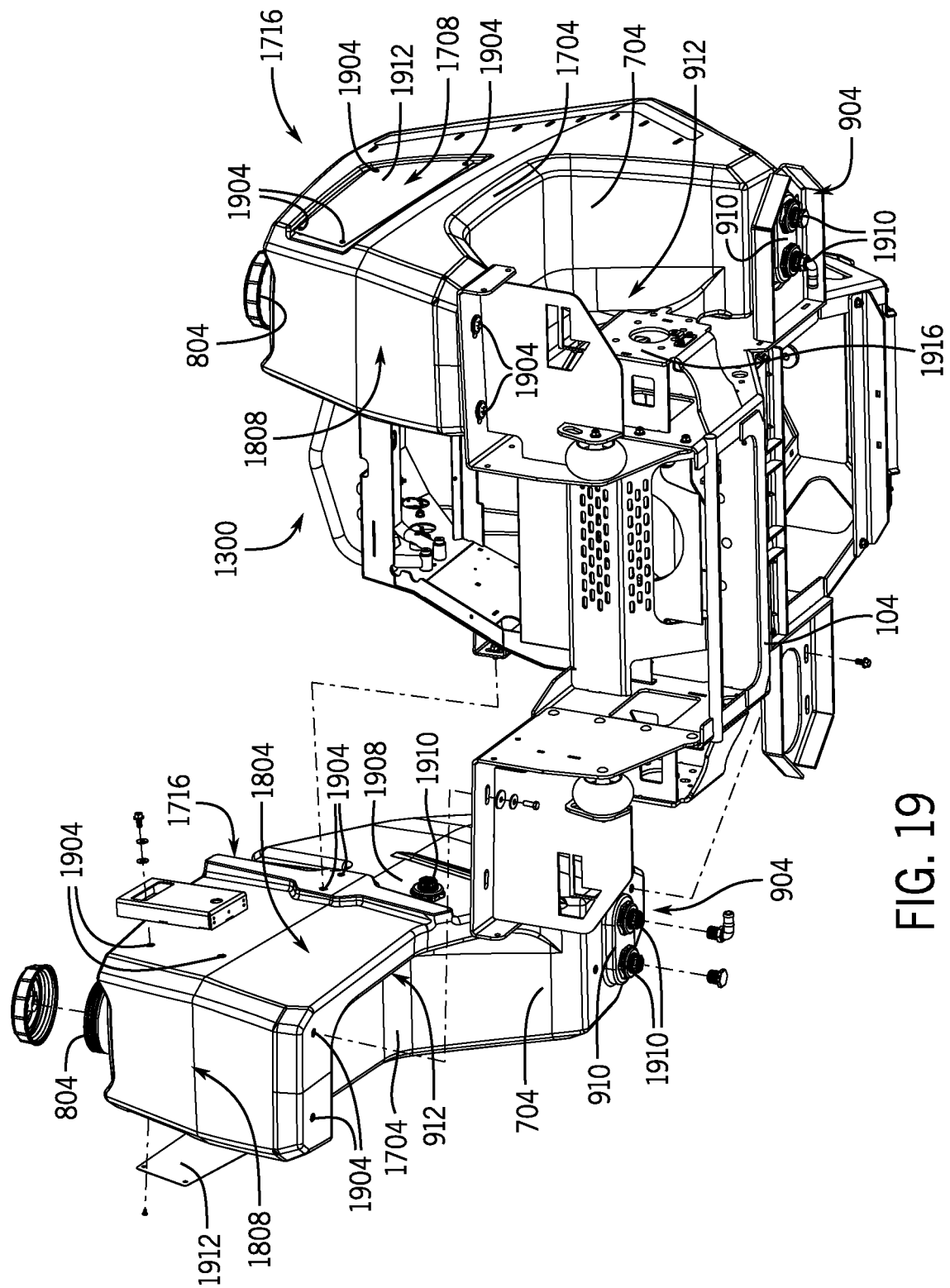
FIG. 19 is a front exploded view of a support frame, the user interface, and the chemical storage tanks of the ride-on spreader/sprayer of FIG. 1.

Referring now to FIGS. 17-19, the spreader/sprayer 100 is illustrated according to an exemplary embodiment. As previously described, the chemical storage tank 704 is configured to receive a fluid and includes the inlet 804 through which the fluid is received and the dry material storage volume 808, where dry material is received and stored. The spreader/sprayer 100 may include two chemical storage tanks 704, one on the left side (e.g., a left chemical storage tank 704) and one on the right side (e.g., a right chemical storage tank 704). As shown in FIGS. 17-19, the chemical storage tank 704 is located above and around the respective wheel 108 of the first wheels 108 (e.g., the left chemical storage tank 704 is located above and around a left wheel 108 of the first wheels 108). In this way, when the chemical storage tank 704 is entirely full of fluid the weight of the chemical storage tank 704 is substantially located at the respective wheel 108. By bearing the weight of the chemical storage tank 704, the respective wheel 108 has much better traction than if the weight were in substantially in front of or behind the wheel 108. To allow the chemical storage tank 704 to be located above and around the respective wheel 108, the chemical storage tank 704 includes a wheel well 1704. The wheel well 1704 is a recess in the chemical storage tank 704 that is slightly wider than the respective wheel 108.

Each wheel 108 has a first sidewall 1720, a second sidewall 1721 shown in (FIG. 25) located opposite the first sidewall 1720, and a tread 1724 that extends between the two sidewalls 1720 and 1721. The first sidewall 1720 (e.g., the outwardly facing sidewall) generally faces outward from the center of the ride-on spreader/sprayer 100 when coupled to the support frame 104, and the second sidewall 1721 (e.g., the inwardly facing sidewall) generally faces inward toward the center of the ride-on spreader/sprayer 100 when coupled toward the support frame 104. Each wheel 108 rotates about a centrally-located axis of rotation so that the tread 1724 rides along the surface being travelled. In one embodiment, the tread 1724 of each wheel 108 is wider (e.g., there is more tread 1724) than on a common ride-on spreader/sprayer. This provides more contact between each wheel 108 and the surface that is being travelled. In this way, each wheel 108 has better traction with the surface being travelled, and the ride-on spreader/sprayer 100 can navigate steeper grades (e.g., inclines and declines). The wheel well 1704 at least partially surrounds the respective wheel 108 (e.g., on three sides), while still allowing the respective wheel 108 to be accessed through the opening of the wheel well 1704 (e.g., the first sidewall 1720 of the wheel 108 is visible in the wheel well 1704). In this way, the wheel well is 1704 is formed in the respective chemical storage tank 704 to define a volume that accommodates the respective wheel 108.

Still referring to FIGS. 17-19, each chemical storage tank 704 is shown to include an outwardly facing side 1708, a front end 1712, a top 1716, and inwardly facing side 1804, and rear end 1808. The outwardly facing side 1708 shown in FIG. 17 generally faces outward from the center of the spreader/sprayer 100, and the opposite inwardly facing side 1804 shown in FIG. 18 generally faces inward toward the center of the spreader/sprayer 100 toward. The front end 1712 is located toward the front of the spreader/sprayer 100 (e.g., toward the front axle 112) and the rear end 1808 is located at the rear of the spreader/sprayer 100. The directions used in describing the storage tanks 704, the first sidewall and second sidewall 1720, 1721 are relative to the normal operating position of the spreader/sprayer when traveling in the forward direction of travel (i.e., with the spray nozzles 308 located in front of the user in the normal operating position on the user platform 120. The top 1716 and is located above the sides 1708, 1804, and the ends 1712, 1808. As shown in FIG. 19, each chemical storage tank 704 is coupled to the frame through one or more mounting openings 1904. Multiple mounting openings 1904 are provided to receive a fastener to couple the respective chemical storage tank 704 to the support frame 104. In one embodiment, the chemical storage tank 704 includes extra material in areas where a mounting opening 1904 is located so that the mounting opening 1904 does not extend into a chemical storage volume 2516 (shown in FIGS. 25-26) of the chemical storage tank 704, preventing leaks.

Each chemical storage tank 704 is further shown to include a fluid return entrance 1908 and a metal cover 1912. The fluid return entrance 1908 is fluidly coupled to a tank return pathway (e.g., the first tank return pathway 1140 or the second tank return pathway 1144) to receive the return fluid during operation of the sprayer valve system 1104. In some embodiments, the fluid return entrance 1908 receives a hose fitting 1910 that can then be coupled to a hose and/or a valve (e.g., a ball valve)) that is movable between an open position and a closed position. In other embodiments, the fluid return 1908 entrance is located generally lower on the chemical storage tank 704 (e.g., below a midline of the chemical storage tank 704). In this way, the fluid does not splash when it enters the chemical storage tank 704. Additionally, the outlet exit 910 is further shown to receive one or more hose fittings 1910. Each metal cover 1912 is located on the outwardly facing side 1708 of the respective chemical storage tank 704 and receives one or more fasteners to couple it to the chemical storage tank 704. In this way, items such as small yard tools (a tire gauge) may be placed behind the metal cover 1912 for storage.

Still referring to FIG. 19, the support frame 104 is further shown to include one or more rear wheel support assemblies 1916. The rear wheel support assembly 1916 is configured to receive a drive shaft (e.g., a drive shaft from the first, second hydrostatic transmissions 1508, 1512 or the first, second electric wheel motors 1612, 1616) that is then coupled to one of the wheels 108. Each rear wheel support assembly 1916 is at least partially below the drain channel 912 and extends from the support frame 104. In this way and is will be described in further detail herein, the tread 1724 of each wheel 108 is adjacent a top portion 2204 of the wheel well 1704.

Figure 20:
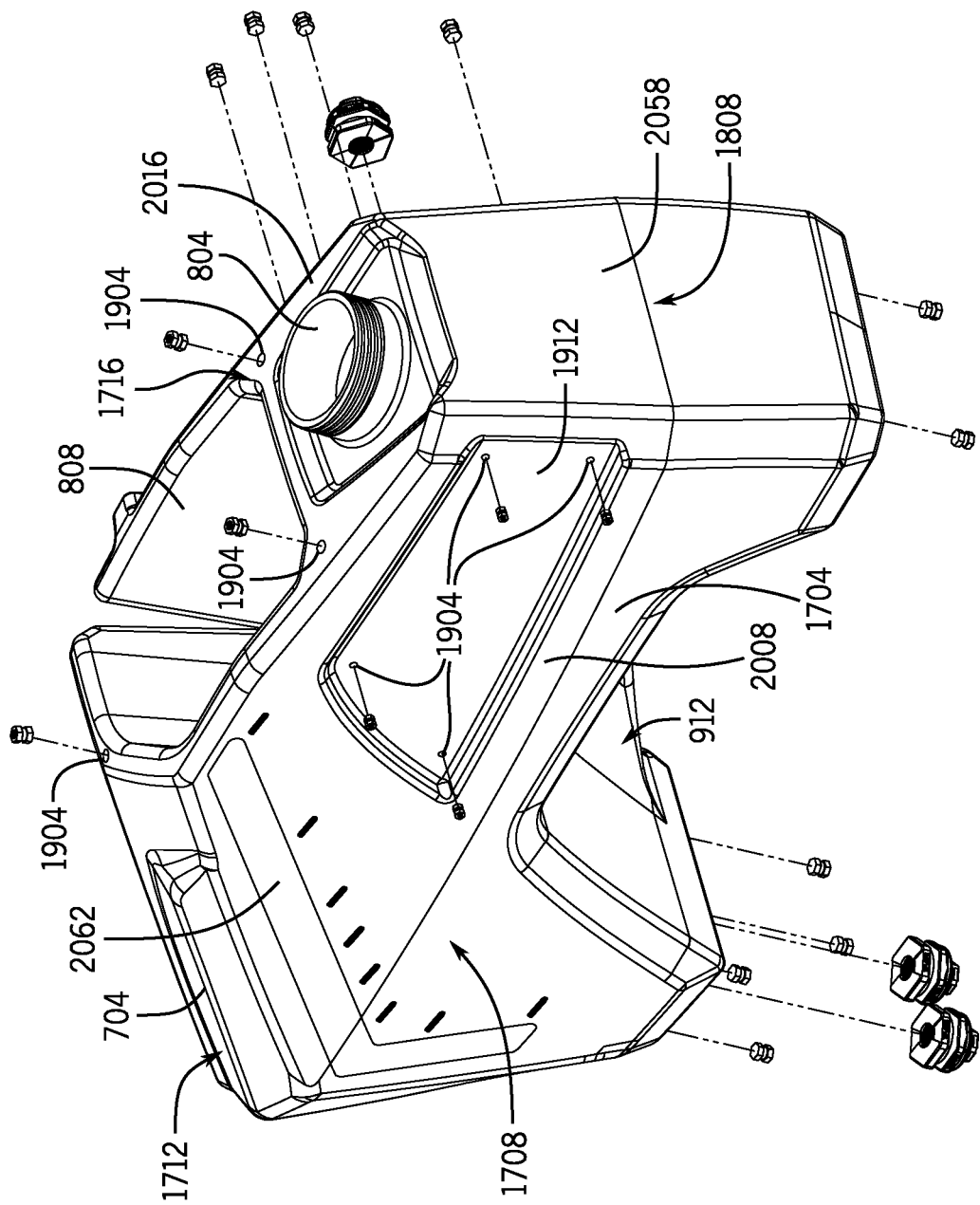
FIG. 20 is a rear perspective view of the chemical storage tank of the ride-on spreader/sprayer of FIG. 1.
Figure 21:
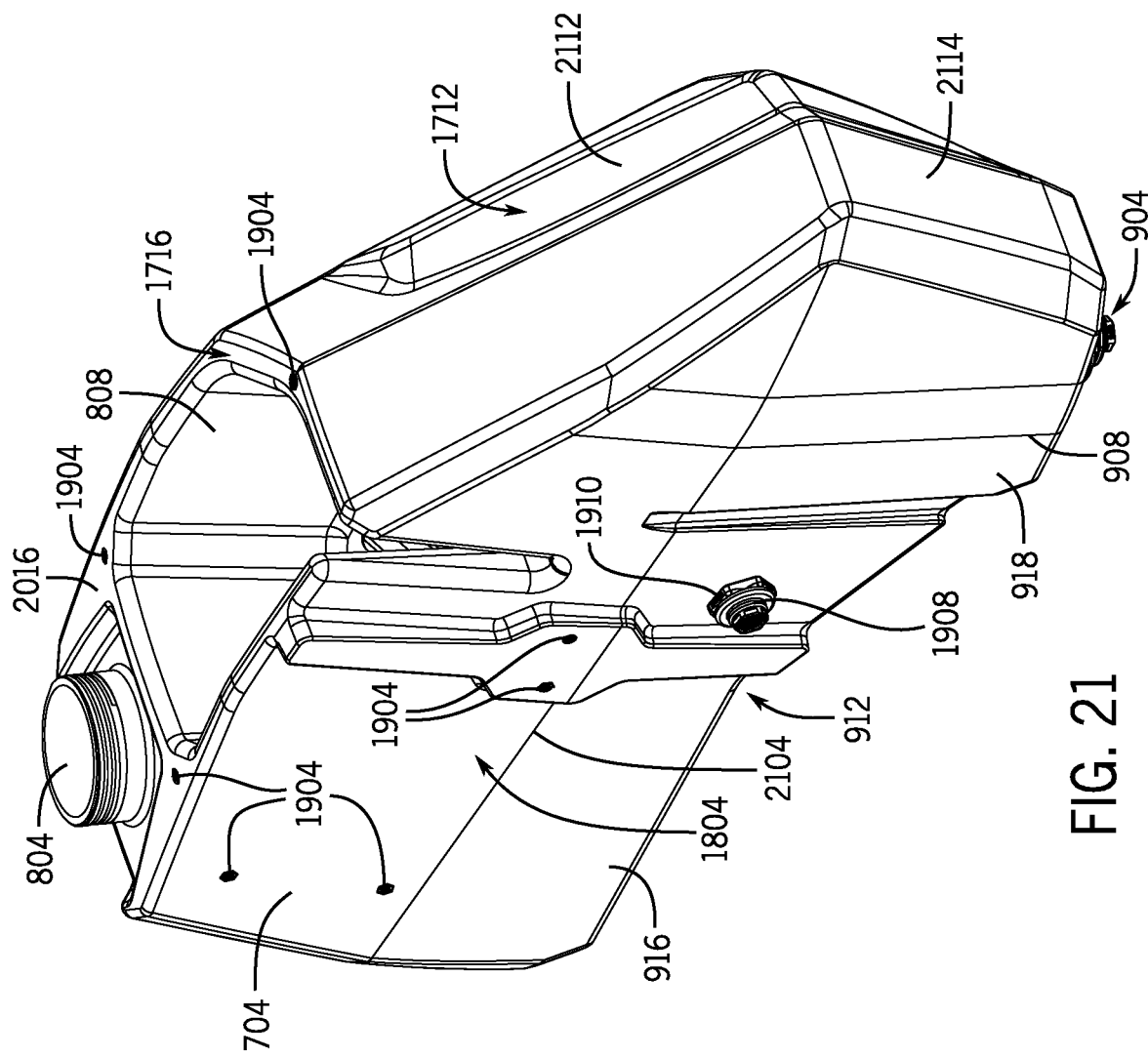
FIG. 21 is a front perspective view of the chemical storage tank of FIG. 20.
Figure 22:
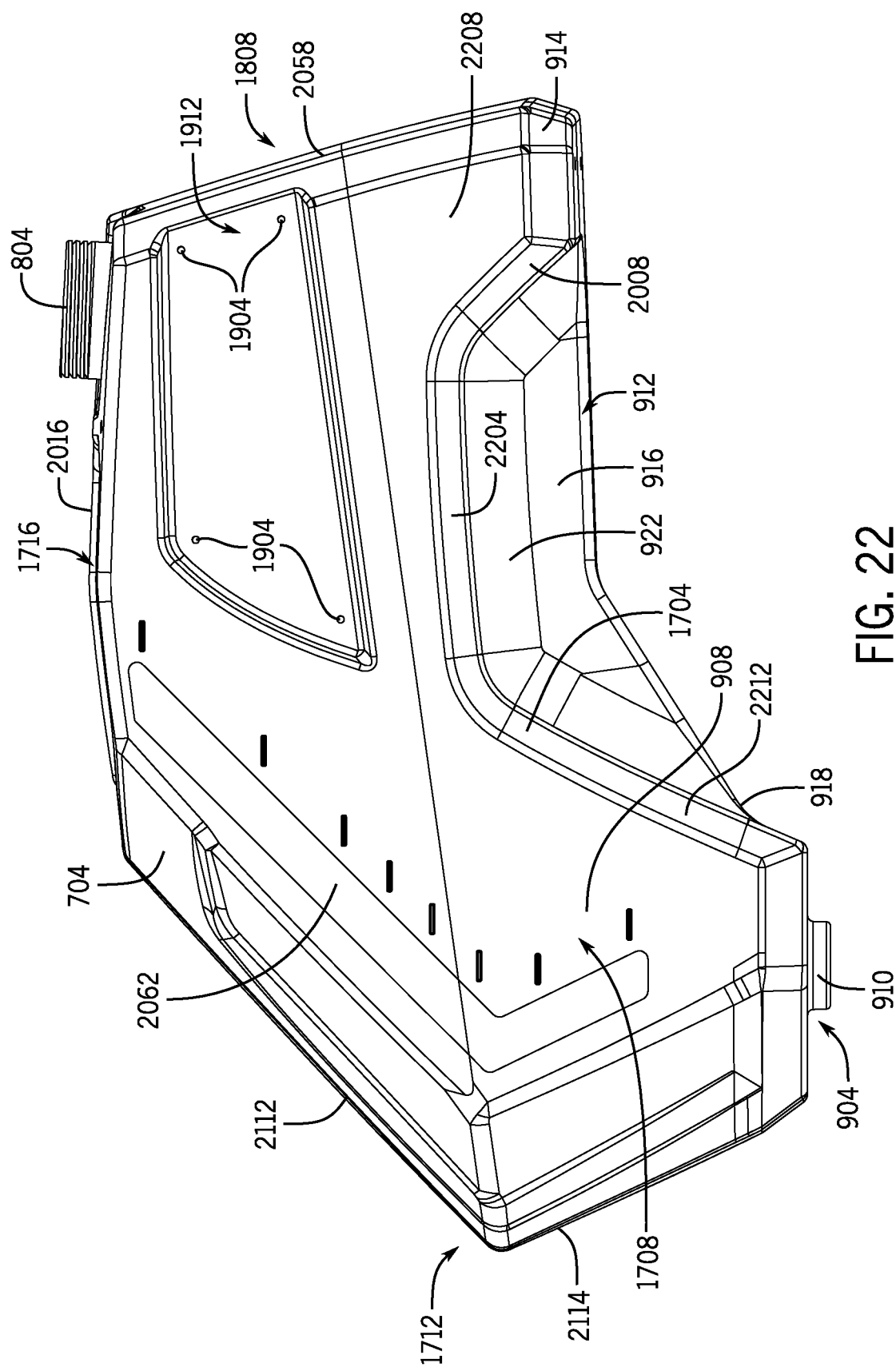
FIG. 22 is a side view of the chemical storage tank of FIG. 20.

Referring now to FIGS. 20-22, one of the chemical storage tanks 704 (e.g., the left chemical storage tank 704) is shown in more detail. Each chemical storage tank 704 further includes five sidewalls: a first sidewall 2008 located along the outwardly facing side 1708, a second sidewall 2104 located along the inwardly facing side 1804, a third sidewall 2058 located along the rear end 1808, a fourth sidewall 2112 and a fifth sidewall 2114 both having a relatively slanted shape and located along the front end 1712, the fourth sidewall located relatively higher (e.g., closer to the top 1716 than the fifth sidewall 2114). The chemical storage tank further includes a top portion 2016 through which the inlet 804 and the dry material storage volume 808 are formed. As will be described further herein each chemical storage tank further includes one or more bottoms. Together, all of the structural components (e.g., the five sidewalls, the top portion 2016, and the bottoms) form the chemical storage volume 2516 of the chemical storage tanks 704. As shown in FIGS. 20 and 22, the chemical storage tank 704 further includes a clear portion 2062 integrally formed into the first sidewall 2008. The clear portion 2062 is a clear portion (e.g., see through, opaque, slightly opaque) that allow the user of the ride-on spreader/sprayer 100 to see the level of fluid within the chemical storage volume 2516. In this way, the user simply needs to look the clear portion 2062 of the first sidewall 2008 to determine if the chemical storage tank 704 is low on the fluid. This provides an easier check compared looking into the inlet 804. In some embodiments, the clear portion 2062 is a slightly opaque portion 2062 that simply allows the user to see the shadow of the fluid within the chemical storage volume 2516.

Additionally, the chemical storage tank 704 includes the drain channel 912. The drain channel 912 is located along the inwardly facing side 1804, opposite the outwardly facing side 1708 and the wheel well 1704 and runs adjacent and behind the respective tire 108. As shown, the drain channel 912 extends approximately from the rear end 1808 to the front end 1712 and includes a general decline with the front end 1712 of the drain channel 912 located above the rear end when the spreader/sprayer is in a normal operating position on a horizontal surface. In general, when the fluid level within the chemical storage tank 704 is low or when the spreader/sprayer 100 is traversing a hill, the fluid within the chemical storage tank 704 cannot flow past the wheel well 1704 to reach the outlet entrance 906. To allow fluid to reach the outlet exit 910, the drain channel 912 is located opposite the wheel well 1704 and provides a second, generally downhill, route the fluid may take to reach the outlet exit 910. In this way, when the chemical storage tank 704 is running low on fluid or traversing a hill fluid may reach the outlet exit 910 through the drain channel 912.

Figure 23:
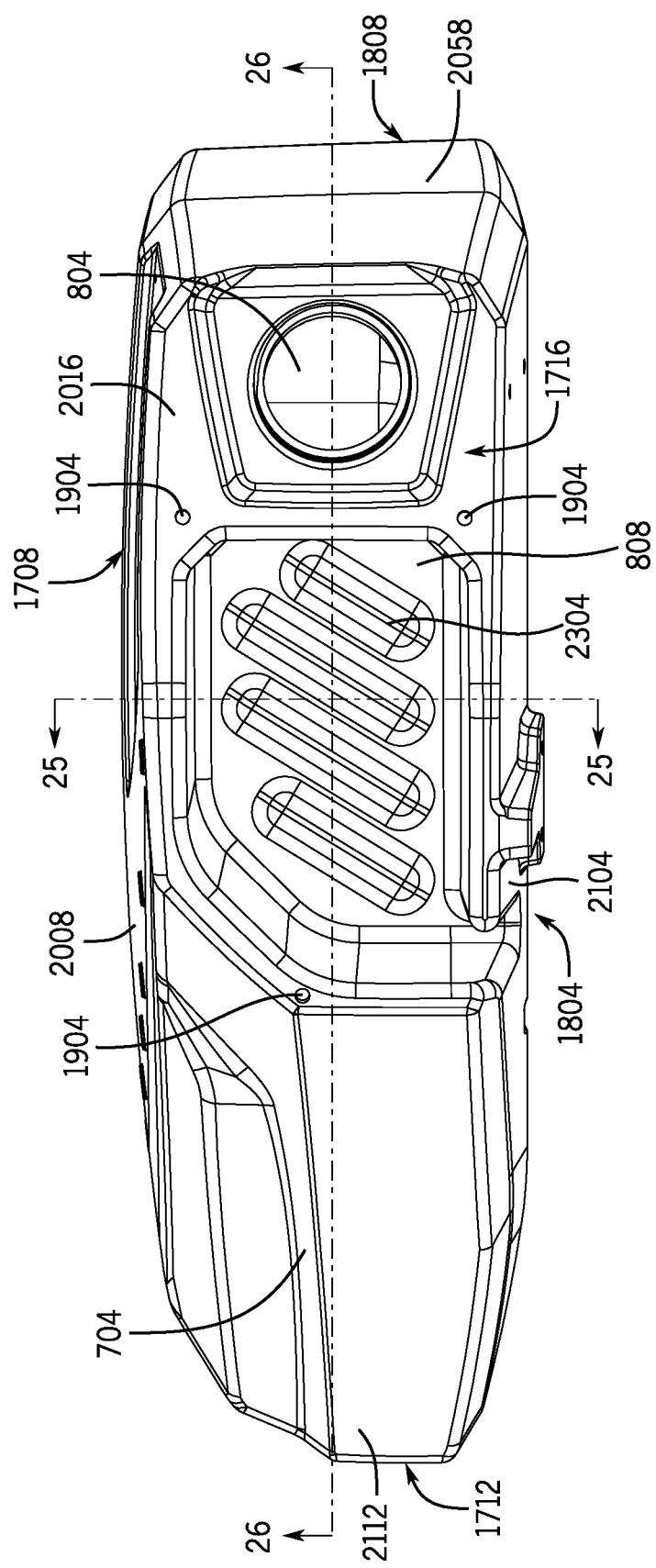
FIG. 23 is a top view of another chemical storage tank of the ride-on spreader/sprayer of FIG. 1.

The drain channel 912 includes a drain entrance 914, a drain passage 916, and a drain exit 918. To reach the outlet exit 910, the fluid enters the drain channel 912 at the drain entrance 914, travels through the drain passage 916, and exits the drain channel 912 at the drain exit 918. At the drain exit 918, the fluid enters the outlet passage 908. As best shown in FIG. 23, the drain entrance 914 extends from the outwardly facing side 1708 to the inwardly facing side 1804 and includes a slight decline in height from the outwardly facing side 1708 to the inwardly facing side 1804. In this way, the fluid naturally flows from into the drain entrance 914 to the drain passage 916. Because the drain channel 912 allows the fluid to flow downward and generally adjacent to the respective wheel 108, the chemical storage tank 704 can be located lower on the spreader/sprayer 100 than is common. This provides for a lower center of gravity on the spreader/sprayer 100, allowing the spreader/sprayer 100 to better traverse hills. Additionally because the drain channel 912 provides a second fluid passage (the outlet 904 being the first fluid passage,) for the fluid to reach the outlet exit 910 (e.g., the chemical storage tank 704 exit), the spreader/sprayer 100 provides a more even and consistent fluid spray when traversing hills or other terrains.

The drain channel 912 further includes an outwardly facing surface 922, the outwardly facing surface 922 faces outward from the center of the spreader/sprayer 100 and is a part of the drain passage 916 (e.g., the front part). As shown, the outwardly facing surface 922 extends downward from a top portion 2204 of the wheel well 1704. The wheel well 1704 is formed into the chemical storage tank 704 to define a volume to accommodate the respective wheel 108. The wheel well 1704 further includes a front portion 2212 and a rear portion 2208. As shown, the wheel well 1704 includes a generally curved shape (e.g., generally round shape) that is configured to receive the wheel 108. The generally curved shape starts at the rear portion 2208 (proximate the rear end 1808, the third sidewall 2058, the drain entrance 914, the outwardly facing side 1708, and the first sidewall 2008), extends vertically upward and relatively curved to the top portion 2204 (proximate the outwardly facing surface 922, the outwardly facing side 1708, and the first sidewall 2008), and extends vertically downward and relatively curved to the front portion 2212 (proximate the drain exit 918, the outwardly facing side 1708, and the first sidewall 2008). In some embodiments, the front portion 2212 is forms the outlet passage 908, allowing fluid to reach the outlet exit 910 of the chemical storage tank 704. In this way, the wheel well 1704 is formed through the outwardly facing side 1708 in order to accommodate or receive the respective wheel 108. In some embodiments, the front portion 2212 is vertically lower than the rear portion 2208.

Figure 24:
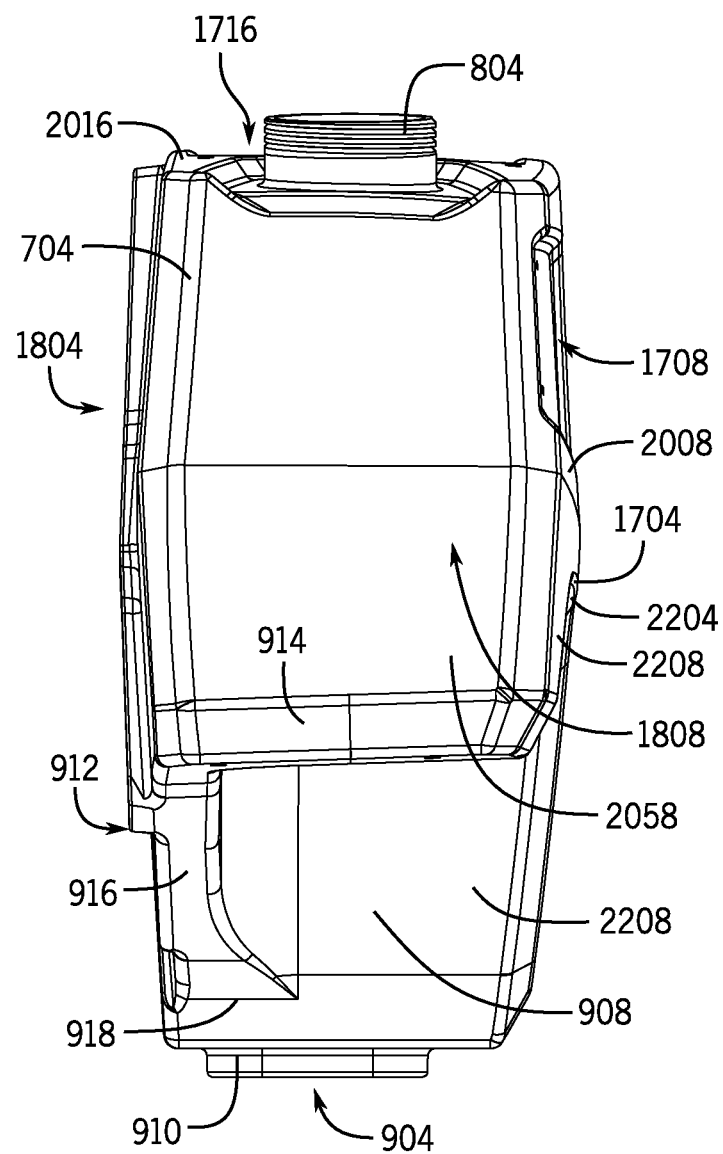
FIG. 24 is a rear view of the chemical storage tank of FIG. 23.

Referring now to FIGS. 23-24, one of the chemical storage tanks 704 (e.g., the right chemical storage tank 704) is shown in more detail. As shown, the right chemical storage tank 704 is substantially the same as the left chemical storage tank 704, with the difference being they are mirrored across the center of the ride-on spreader/sprayer 100. For example, the outwardly facing side 1708 of the right chemical storage tank 704 is located on approximately the same side as the inwardly facing side 1804 of the left chemical storage tank 704. In this way, the two chemical storage tanks 704 are symmetrical across the center of the ride-on spreader/sprayer 100. Additionally, as can be noticed in FIG. 23, the dry material storage volume 808 further includes one or more gripping surfaces 2304. The gripping surfaces 2304 are simply raised surfaces that provide more surface area (e.g., more friction) to the material received within the dry material storage volume 808. As a result, the dry material received within the dry material storage volume 808 better stays in place due to the gripping surfaces 2304.

Figure 25:
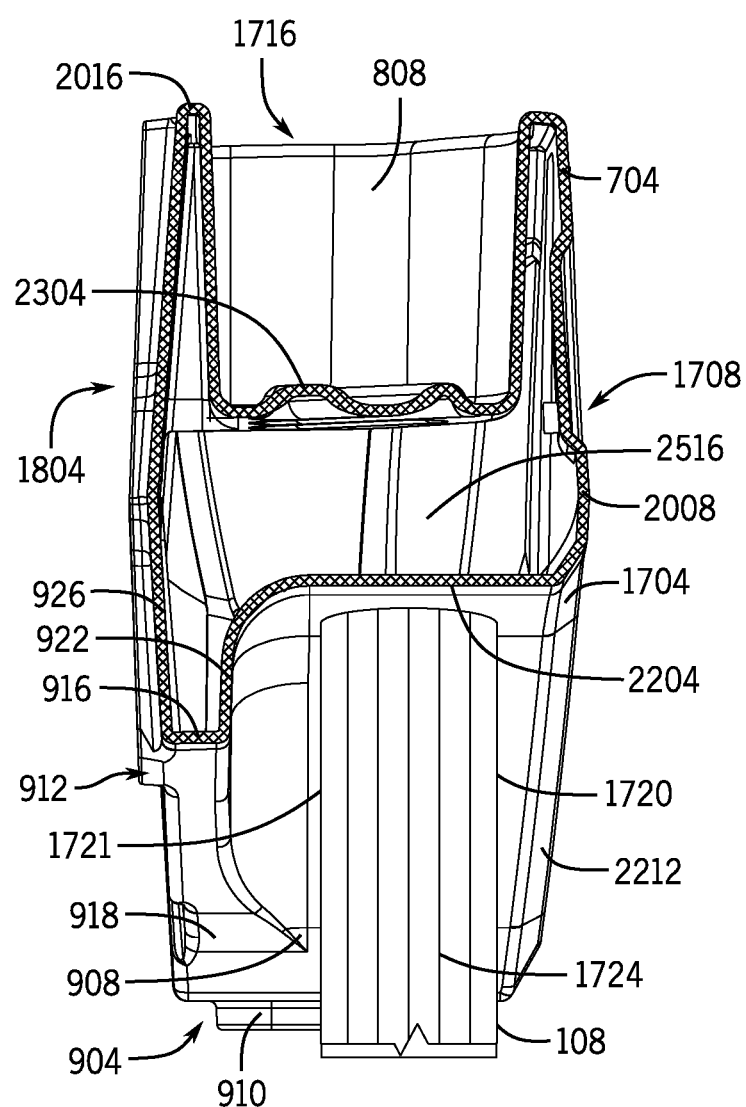
FIG. 25 is a section view along line 25-25 of the chemical storage tank of FIG. 23.
Figure 26:
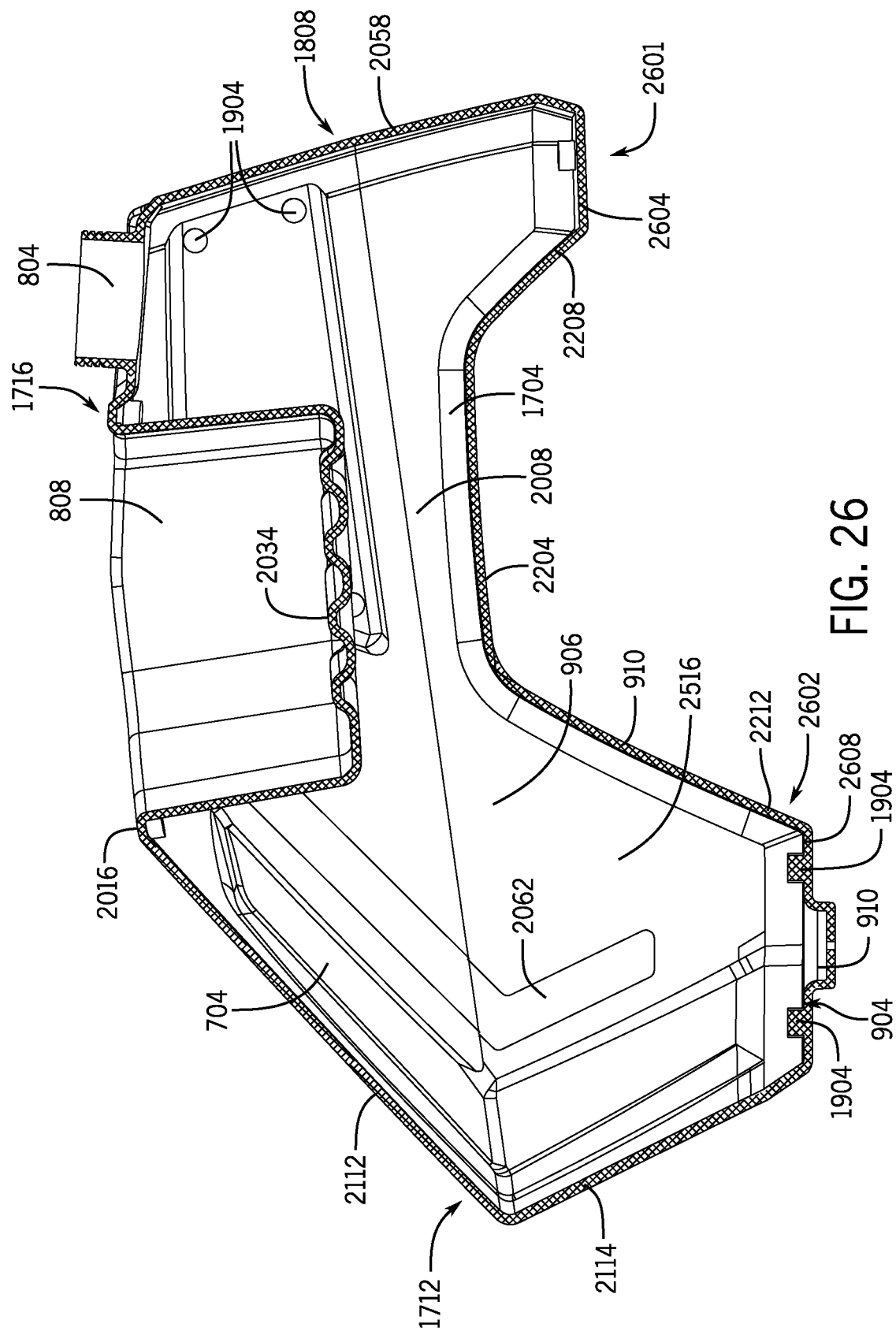
FIG. 26 is a section view along line 26-26 of the chemical storage tank of FIG. 23.

Referring now to FIGS. 25-26, two sectional view of the chemical storage tank are shown. FIG. 25 shows the chemical storage tank 704 along line B-B of FIG. 23 and with a part of the wheel 108 within the wheel well 704. The drain channel 912 further includes the outwardly facing surface 922 and an inwardly facing surface 926 (the inwardly facing surface 926 facing toward the center of the ride-on spreader/sprayer 100). The outwardly facing surface 922 is located adjacent the second sidewall (1721) (e.g., a rear side) of the wheel 108, and extends downward from a top portion 2204 of the wheel well 1704. The top portion 2204, the rear portion 2208, and the front portion 2212 of the wheel well 1704 are adjacent the tread 1724 of the wheel 108. In this way, the wheel well 1704 at least partially surrounds the wheel 108 (e.g., on three sides). As such, the top portion 2204, the rear portion 2208, and the front portion 2212 of the wheel well 1704 are shaped to accommodate the circular shape of the wheel 108. Further, during operation, much of the fluid stored within the chemical storage tank 704 is located directly above the top portion 2204 of the wheel well 1704. Therefore, because the top portion 2204 is directly adjacent tread 1724 of the wheel 108, the weight of the fluid pressing down on the top portion 2204 is better transferred to the tread 1724 and the wheel 108.

As shown in FIG. 26, a section view along line A-A of FIG. 22, the chemical storage tank 704 is further shown to include a first bottom portion 2601 and a second bottom portion 2602. The first bottom portion 2601 includes a first bottom surface 2604, and the second bottom portion 2602 includes a second bottom surface 2608 as well as the outlet exit 910. The first bottom portion 2601 and the second bottom portion 2602 are located on opposite ends (e.g., near the front portion 2212 and the rear portion 2208) of the wheel well 1704. The first bottom surface 2604 is located relatively higher than the second bottom surface 2608 and is one of the many surfaces that form the drain entrance 914. Additionally, the first bottom surface 2604 is located proximate the rear end 1808. In this way, the second bottom surface 2608 is slightly slanted and extends from the outwardly facing side 1708 to the inwardly facing side 1804 as described previously. The second bottom surface 2608 is relatively flat and extends from the outwardly facing side 1708 to the inwardly facing side 1804. Additionally, the second bottom surface 2608 is located on opposite ends of the chemical storage tank 704 (e.g., is located proximate the front end 1712). The outlet exit 910 is formed through the second bottom surface 2608.

Figure 27:
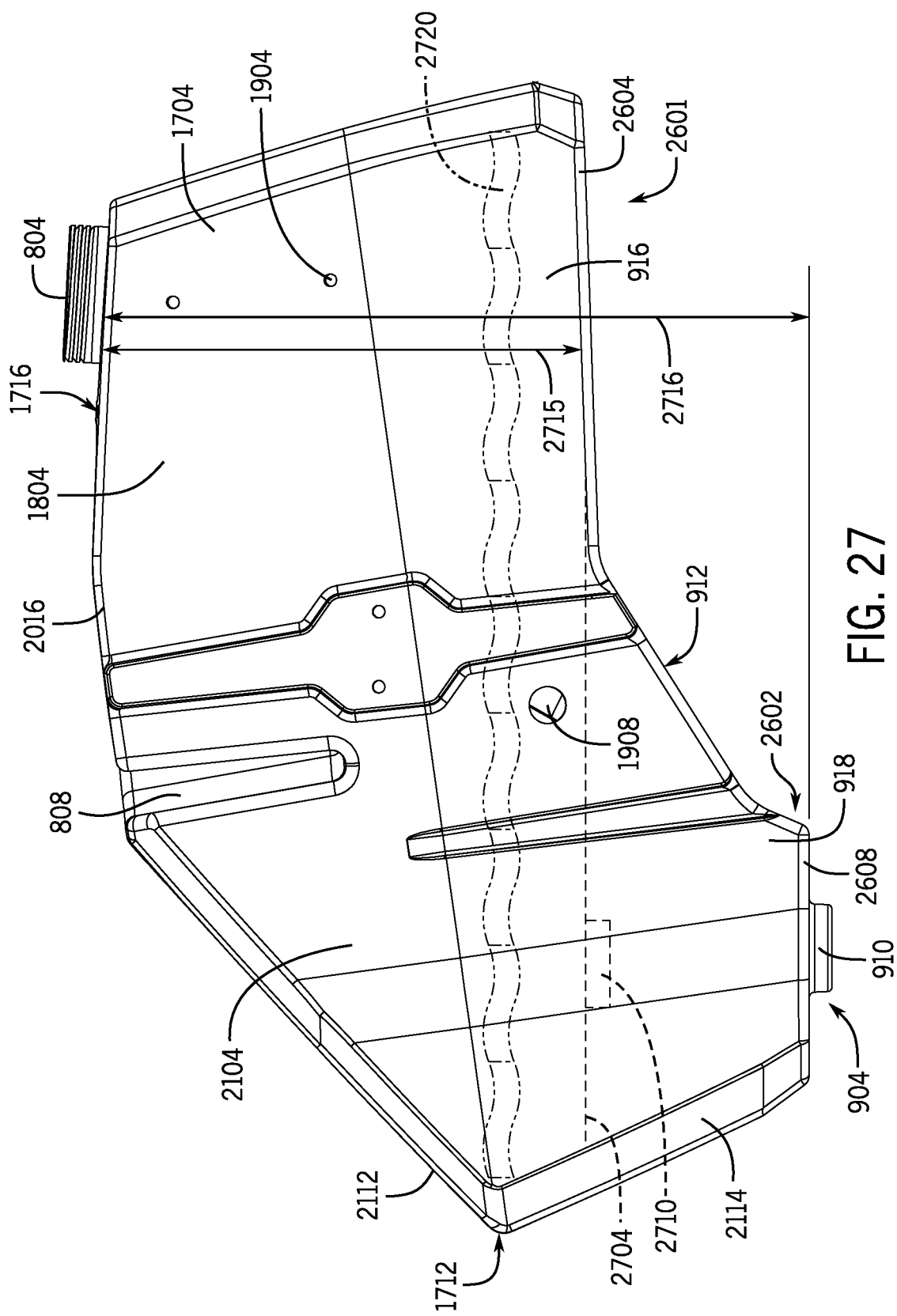
FIG. 27 is a side view of the chemical storage tank of FIG. 23 in comparison with a flat bottomed tank, according to an exemplary embodiment.
Figure 28:
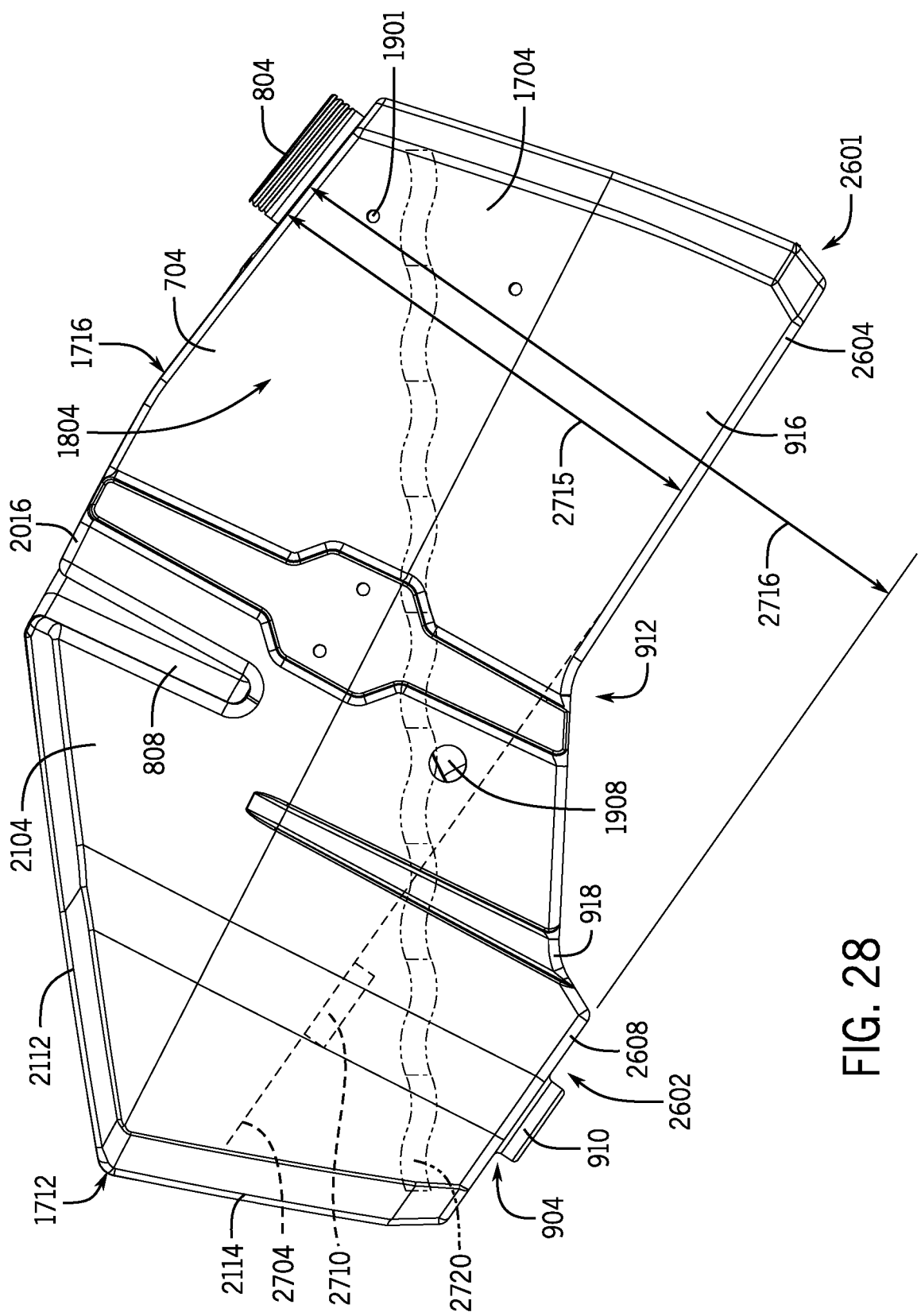
FIG. 28 is a side view of the chemical storage tank of FIG. 23 in comparison with the flat bottom tank on an incline.

Referring now to FIGS. 27-28, the chemical storage tank 704 is shown with a comparison to a flat bottomed tank (in dashed lines). The flat bottomed tank includes an outlet exit 2710 located along a first bottom surface 2604. The bottom surface 2604 extends from the first bottom surface 2604 in a relatively flat line (i.e. flat bottom tank) and includes the outlet exit 2710 formed there through. The chemical storage tank 704 provides for two depths of fluid storage, a first depth 2715 and a second depth 2716. The first depth 2715 is the distance between the inlet 804 and the first bottom surface 2604. The second depth 2716 is the (vertical) distance between the inlet 804 and the surface through which the outlet exit 910 is formed. The flat bottom tank provides only a single depth equal to the first depth 2715 of the storage tank 704. As shown in FIG. 27, because the second bottom surface 2608 is located relatively lower than the first bottom surface 2604, the second depth 2716 is larger than the first depth 2715. In some embodiments, the second depth 2716 may be twice the size of the first depth 2715. In even other embodiments, the second depth 2716 is four times the size of the first depth 2715. In additional embodiments, the second depth 2716 is 1.25 times the size of the first depth 2715. By having this large difference in size between the first depth 2715 and the second depth 2716, the drain channel 912 may extend farther down vertically, and better drain fluid even when the chemical storage tank 704 is tipped.

Still referring to FIGS. 27-28, the chemical storage tank 704 is shown filled with a fluid according to an exemplary embodiment. In FIG. 27, in a horizontal operating position, the fluid is located approximately a fluid level 2720 and covers both the first bottom 2704 and the second bottom 2708. As shown in FIG. 27, the fluid can reach the first outlet exit 910. In the exemplary flat bottom tank, the fluid can also reach outlet exit 2710 in a horizontal operating position. However, when the chemical storage tank 704 is rotated forward as shown in FIG. 283 (e.g., when the spreader-sprayer 100 is traveling down a slope or incline) the fluid level 2720 remains above the outlet exit 910, allowing fluid to reach the outlet exit 910 and feed fluid nozzles 308. However, in the exemplary flat bottom tank, the fluid level 2720 is below the outlet exit 2710 and fluid cannot exit the exemplary flat bottom storage tank. In operation, this would starve the fluid nozzles 308 and prevent the spread/sprayer 100 from spraying fluid. In comparison, in the storage tank 704 the fluid can still reach the outlet exit 910, due to the drain channel 912. In this way, the drain channel 912 allows the spreader/sprayer 100 to spray fluid on steeper grades of incline than is possible with a flat bottom storage tank. As a result, the user of the spreader/sprayer 100 does not have to manually spray large grades (e.g., hillsides), thereby by saving on time to apply fluid to a job site by increasing the amount of time the user is able use the spreader/sprayer 100 while mounted and reducing the time where the user is dismounted and applying fluid manually. In some embodiments this may enable the spreader/sprayer 100 to spray fluid on grades up to 30 degrees.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A ride-on spreader/sprayer, comprising:
   a hopper configured to receive and expel dry material;
   a user platform configured to receive and support a user of the ride-on spreader/sprayer;
   a fluid storage tank providing a fluid storage volume and including:
      an inlet for adding fluid to the fluid storage volume,
      an exit by which the fluid exits the fluid storage volume,
      a first internal fluid passage integrally formed along a first wall of the fluid storage tank and arranged within the fluid storage tank, and
      a drain channel defining a second internal fluid passage integrally formed along a second wall of the fluid storage tank and arranged within the fluid storage tank and separate from the first internal fluid passage, wherein the first internal fluid passage and the second internal fluid passage are both in fluid communication with the exit;
   a pump fluidly coupled to the exit of the fluid storage tank; and
   a plurality of spray nozzles fluidly coupled to the pump.

2. The ride-on spreader/sprayer of claim 1, further comprising:
   a rear wheel;
   wherein the fluid storage tank further includes a wheel well; and
   wherein the rear wheel is positioned in the wheel well so that the fluid storage tank is at least partially located above the rear wheel.

3. The ride-on spreader/sprayer of claim 2, wherein the wheel well further includes a top portion, a front portion, and a rear portion that are shaped to accommodate a circular shape of the rear wheel.

4. The ride-on spreader/sprayer of claim 3, wherein the fluid storage tank further includes a first bottom portion and a second bottom portion, the first bottom portion located vertically higher than the second bottom portion, and wherein the top portion of the wheel well is located between the first bottom portion and the second bottom portion and is located vertically higher than at least part of the first bottom portion.

5. The ride-on spreader/sprayer of claim 1, wherein the fluid storage tank further includes a clear portion integrally formed in a sidewall located along an outwardly facing side of the fluid storage tank.

6. The ride-on spreader/sprayer of claim 1, further comprising a boom, wherein the spray nozzles are coupled to the boom.

7. The ride-on spreader/sprayer of claim 6, wherein the boom comprises:
   a base;
   a first wing pivotally attached to the base such that the first wing can pivot relative to the base; and
   a second wing pivotally attached to the base such that the second wing can pivot relative to the base, wherein at least one of the spray nozzles is coupled to each of the first wing and the second wing.

8. The ride-on spreader/sprayer of claim 1, wherein the first wall is defined along an outwardly-facing side of the fluid storage tank, and the second wall is defined along an inwardly-facing side of the fluid storage tank.

* * * * *